(12) United States Patent
Anderson et al.

(10) Patent No.: US 8,944,006 B2
(45) Date of Patent: Feb. 3, 2015

(54) ANIMAL TRAINING DEVICE AND METHODS THEREFOR

(71) Applicant: Smart Animal Training Systems, LLC, Indianapolis, IN (US)

(72) Inventors: Wesley H. Anderson, Indianapolis, IN (US); Larry O'Cull, Westfield, IN (US); Adam Minniear, West Lafayette, IN (US); Brent Adamson, Westfield, IN (US); Anthony F. Furdock, Indianapolis, IN (US); Zachary Bertram, Westfield, IN (US)

(73) Assignee: Smart Animal Training Systems, LLC, Indianapolis, IN (US)

( * ) Notice: Subject to any disclaimer, the term of this patent is extended or adjusted under 35 U.S.C. 154(b) by 106 days.

(21) Appl. No.: 13/923,169

(22) Filed: Jun. 20, 2013

(65) Prior Publication Data

US 2014/0083364 A1    Mar. 27, 2014

Related U.S. Application Data

(60) Provisional application No. 61/662,293, filed on Jun. 20, 2012.

(51) Int. Cl.
*A01K 5/00* (2006.01)
*A01K 15/02* (2006.01)

(52) U.S. Cl.
USPC ........................................ 119/51.01; 119/719

(58) Field of Classification Search
USPC ........... 119/51.01, 51.02, 53.5, 54, 61.2, 702, 119/712, 719, 905; 273/440
See application file for complete search history.

(56) References Cited

U.S. PATENT DOCUMENTS

| 3,991,908 | A |   | 11/1976 | Thomas et al. |
|---|---|---|---|---|
| 4,711,371 | A | * | 12/1987 | Harrigan ....................... 221/310 |
| 4,770,125 | A | * | 9/1988 | Gold et al. .................... 119/53.5 |
| 4,823,738 | A | * | 4/1989 | Gold ........................... 119/51.01 |
| 4,889,077 | A |   | 12/1989 | Possis |
| 5,873,326 | A |   | 2/1999 | Davet et al. |
| 6,176,230 | B1 |   | 1/2001 | Thompson |
| 6,263,836 | B1 |   | 7/2001 | Hollis |
| 6,273,027 | B1 |   | 8/2001 | Watson et al. |
| 6,367,417 | B1 |   | 4/2002 | Gal et al. |
| 6,487,992 | B1 |   | 12/2002 | Hollis |

(Continued)

*Primary Examiner* — Yvonne Abbott
(74) *Attorney, Agent, or Firm* — E. Victor Indiano; Indiano Law Group, LLC

(57) ABSTRACT

In accordance with the present invention, a training device is provided for training animals to perform or refrain from performing a target activity. The training device includes a reward dispenser that is capable of dispensing a reward to an animal being trained upon receiving a reward dispensing command. The reward dispensing command includes a hopper for holding a quantity of rewards. The hopper includes an entrance port for receiving rewards and an exit port through which rewards can be dispensed. The reward dispenser also includes a delivery assembly for controllably delivering rewards from the hopper to the exit port, the delivery members being placeable in contact with the rewards to be delivered. A motor member is provided that is capable of maintaining the delivery members in a static position to prevent the delivery of a reward, and moving the delivery member to deliver at least one reward to the exit port. The delivery member includes at least one bristle-containing member. A controller is provided that is capable of receiving a command and actuating the motor upon receipt of the command to move the delivery member to thereby dispense a reward to the exit port.

21 Claims, 19 Drawing Sheets

(56) References Cited

U.S. PATENT DOCUMENTS

| | | |
|---|---|---|
| 6,651,592 B2 | 11/2003 | Maddox et al. |
| 6,694,916 B1 * | 2/2004 | Rucker et al. ............... 119/51.01 |
| 6,983,719 B2 * | 1/2006 | Armstrong ................. 119/51.02 |
| 7,143,719 B1 | 12/2006 | Giddens et al. |
| 7,252,051 B2 | 8/2007 | Napolez et al. |
| 7,263,953 B2 | 9/2007 | Sundararajan |
| 7,328,671 B2 | 2/2008 | Kates |
| 7,380,518 B2 | 6/2008 | Kates |
| 7,409,924 B2 | 8/2008 | Kates |
| 7,424,867 B2 | 9/2008 | Kates |
| 7,434,541 B2 | 10/2008 | Kates |
| 7,617,799 B2 | 11/2009 | Kates |
| 7,634,975 B2 | 12/2009 | Kates |
| 7,789,041 B1 | 9/2010 | Taylor |
| 7,861,676 B2 | 1/2011 | Kates |
| 7,946,252 B2 | 5/2011 | Lee, IV et al. |
| 7,984,694 B2 | 7/2011 | Wu et al. |
| 8,807,089 B2 * | 8/2014 | Brown et al. ................. 119/719 |
| 2005/0224003 A1 | 10/2005 | Yin et al. |
| 2011/0297091 A1 * | 12/2011 | Chamberlain et al. ..... 119/51.02 |
| 2013/0047927 A1 * | 2/2013 | Chang et al. ............... 119/57.92 |
| 2014/0058559 A1 * | 2/2014 | Haynes ........................ 700/232 |

\* cited by examiner

ANIMAL TRAINING DEVICE AND METHODS THEREFOR

PRIORITY STATEMENT

The present invention claims benefit of priority to Anderson et al., U.S. Provisional Patent Application No. 61/662,293 filed on 20 Jun. 2012 all of which are fully incorporated herein by reference.

I. TECHNICAL FIELD OF THE INVENTION

The present invention relates to animal training and enrichment devices, and more particular, to an animal training device useable by animal owners and animal trainers to train animals to perform desired behaviors and to avoid performing undesirable behaviors.

II. BACKGROUND OF THE INVENTION

It is important for pet owners to train their pets because a well-trained pet makes a better companion whose presence in the owner's home is enjoyable to the owner, and is not marred by bad pet behavior. Unfortunately, training a pet well is not a simple task. When training a pet, it is important to employ good and effective training skills that are applied evenly and consistently. Without the even and consist application of the training exercises, the pet will often become confused.

Additionally, training also requires an investment of time and commitment. Many busy pet owners find it difficult to find sufficient free time to devote to training their pets. Due to these time limitations, a good training tool should enable the trainer to train the animal efficiently.

The lack of time and pet training skill causes many pet owners to employ professional trainers. Although professional pet training helps to result in a better trained pet, professional training has its draw backs. In particular, the labor intensive nature of pet training results in significant training expenses. These expenses can make professional training unaffordable to many pet owners.

Good training methodology should avoid the use of techniques that do not have unwanted side effects on the animals. Training techniques that often result in unwanted side effects include those techniques that involve negative reinforcement or punishment.

One example of a training technique or device that often has unwanted side effects is a shock collar that is employed in training dogs. A shock collar comprises a collar that is worn around a dog's neck that usually includes a battery, a radio receiver and a pair of electrodes. If the dog performs an unwanted behavior, the dog is given a shock (of variable intensity) so that the dog associates the undesirable behavior with the undesirable consequence, and thereby, stops performing the undesirable act.

One application for shock collars is dog training fences, such as those sold under the INVISIBLE FENCE® brand. Such dog training fences include wires buried in the ground to define an area within a user's yard, wherein the buried wire serves as a boundary to that area. A shock collar is placed on the dog that when the dog approaches the buried wire, an audible signal may be given to warn the dog of his approach to the wire. When the dog crosses the wire, the wire will signal the shock collar to release an electrical charge to shock the dog. Through training, the dog will learn to associate a particular spot in the yard where the wire is buried with the adverse reaction of obtaining a shock. This will cause the dog to stay within the boundary defined by the owner's placement of the buried wire to avoid receiving such shocks.

Another application for shock collars is in connection with bark training. In such cases, the collar can be rigged with a microphone to pick up barking and deliver a shock to the dog when the dog barks. Alternately, the shock collar can be equipped with a remote control device that the user actuates when the dog is barking at an inappropriate time, or else fails to stop barking when so instructed by the user.

Although the shock collars used in such training exercises are tools for training the animal to observe or avoid observing certain behaviors, shock collars have draw backs. According to the Merck Veterinary Manual, physical punishments, such as shock collars almost always make an already aggressive dog even more aggressive. Such aggressive behaviors are an undesirable side effect of the use of such shock collars.

Because of these undesirable side effects, many dog trainers believe that such shock collars should not be used. Rather, many believe that a dog is better trained through the use of training techniques that rely more heavily on positive reinforcement, wherein the dog is rewarded for performing a desired behavior, or alternately, rewarded for not performing an non-desirable behavior by the dog being given a reward such as a treat or something else that the dog likes and that makes the dog happy.

There are a variety of behaviors that trainers will attempt to teach an animal to either perform or to avoid performing. For example, dogs are often trained to avoid unwanted behaviors such as barking at the door, jumping on people, resource guarding against other dogs and resource guarding against people. Resource guarding refers to a situation where the dog jealously guards a resource, such as its food. To guard this resource the dog will act in an aggressive manner, such as by barking or snapping at people who approach the dog when it is eating. This behavior is caused because the dog is afraid that its food may be stolen by the other dog or person.

There are also behaviors that pet handlers and owners desire to train the dog to perform, such as crate training. Crate training involves teaching a dog to voluntarily go into its crate at those times, when the user wants the dog to go into its crate. Another desired behavior is for the dog to come to its owner when it is called by its owner. Because of the presence of a large number of animals, it is important for kennel managers to be able to teach their dog good manners, and to counter-condition the fear that an animal might have of another dog. Additionally, because of the large number of animals, it is often desired by kennel owners to be able to automate feeding and record the amount of food eaten by an animal, as a labor-saving feature.

In addition to the training exercises described above, other training exercises exist for dogs involved in sports. For example, training can help to teach a dog agility skills, and also teach a dog to behave properly for a competition obedience-type sports.

Further, those who employ working dogs, such as service dogs, military and police dogs, train their dogs to perform certain acts, and refrain from performing other acts. For example, service dogs are often trained to be able to pull on objects at a constant pressure. This behavior is employed by the dog to help pull people out of wheel chairs. The dog can best be taught to accomplish this task by pulling on a toy held by the wheel chair confined person at a constant pressure. If the dog pulls in a jerky manner (which is the usual behavior that dog's exhibit), the non-constant pressure may create instabilities in the person getting in and out of the wheel chair, and can be more detrimental than valuable to the person getting out of the wheel chair.

Those familiar with training dogs will appreciate that other skill sets and training exercises can occur and be used to train dogs.

Successfully performing training exercises with animals requires attributes such as precise timing, clearly defined criteria, a good rate of reinforcement, consistency, and frequent repetition to ensure that the dog learns the trained activities. For the reasons discussed above, it is often difficult for an owner to achieve these attributes, as many owners lack the time and discipline to perform these training functions effectively, or the monetary resources to have a professional trainer perform these actions. Therefore, it would be helpful if one could automate those tasks, to help train the dog even without the need for human input, or at least with a reduced amount of human input.

One of the central components of many dog training devices is the reinforcement dispensing device. For the reasons discussed above, the preferred embodiment of the present invention uses a reinforcement dispensing device that provides positive reinforcement opposed to the negative reinforcement or positive punishment dispensed by a shock collar. In particular, the Applicant and others have found that one of the best and most reliable rewards for animals, and especially dogs is a treat. A treat might comprise a food product for the dog, or some sort of "treat-like" food product for the dog, or for that matter, any consumable item that the animal enjoys, and is capable of consuming or using only over a short time period, so that the animal will soon desire another treat, so that future desired behaviors can be subsequently rewarded.

One of the difficulties that one encounters with treat dispensing devices is that many of them dispense treats inconsistently, and are limited in the types of treats that they can dispense. Since a wide variety of treat types exist, including many different types of food types and since a wide variety of preferences exist, it would be useful to have a treat dispensing device that is capable of dispensing a wide variety of treats in a controlled, consistent and reliable manner.

Therefore, one object of the present invention is to provide such a treat dispensing device.

The presence of one or more sensors would be useful to employ in a training program as they would allow the system or the owner to increase his knowledge of the animal's condition and or behavior. For example, one type of sensor(s) might comprise a microphone capable of picking up auditory signals from the dog such as barking. Another type of sensor might be a position attitude (pitch, yaw, roll) location sensor that relates to the location and position of the dog.

It is therefore one object of the present invention to provide, in a preferred embodiment, one or more sensors that are capable of providing information about a subject such as an animal being trained. This information may include information relating to the animal's location, its position, its actions, and/or its physiological conditions. The information obtained about the animal can be employed as an input in the system to decide whether to dispense a positive reinforcement (such as a treat) to the animal being trained.

Another issue that has reduced the ability of some prior known food dispensing devices relates to the fact that many devices can only be placed in a limited number of places to such as being restricted to being placed on a floor or horizontal surface. For example, since many service dogs are used to service wheelchair bound patients, it would be helpful to have a reinforcement device such as feeder, that was both attachable to the owner's wheelchair and placeable on a floor so that the treats could be dispensed at the location of the owner.

It is therefore another object of the preferred embodiment of the present invention to provide a feeder that is capable of being used in a wide variety of locations and with a wide variety of devices, to make the feeder more useable to a variety of circumstances.

Another desirable feature of a training device is an ability of the device to be actuated by the animal being trained. Certain training behaviors exist wherein it is desired that the animal being trained perform a particular function.

For example, service dogs are often trained to perform such functions as turning lights on and off, and retrieving drinks for humans out of a refrigerator. As such, providing the dog with a dog actuation device (e.g. a light switch), training the dog to actuate the actuation device, and rewarding the dog therefor, can pro-vide a valuable training tool for the dog, and especially service dogs that are trained to perform such positive functions.

Therefore, it is an object of a preferred embodiment of the present invention to provide a dog training system that incorporates the use of dog or pet actuated devices, both for helping to train the dog to perform, and then, when trained, to enable the dog to initiate certain activities such as opening refrigerator doors, in response to stimuli.

III. SUMMARY OF THE INVENTION

In accordance with the present invention, a training device is provided for training pets to perform or refrain from performing a target activity and enrichment activities. The training device includes a reward dispenser that is capable of dispensing a reward to an animal being trained upon receiving a reward dispensing command. The reward dispensing command includes a hopper for holding a quantity of rewards. The hopper includes an entrance port for receiving rewards and an exit port through which rewards can be dispensed. The reward dispenser also includes a delivery assembly for controllably delivering rewards from the hopper to the exit port. The delivery assembly includes moveable delivery members that are placeable in contact with rewards to be delivered. A motor member is provided that is capable of maintaining the delivery members in a static position to prevent the delivery of a reward, and moving the delivery member to deliver at least one reward to the exit port. The delivery member includes at least one bristle-containing member. A controller is provided that is capable of receiving a command and actuating the motor upon receipt of the command to move the delivery member to thereby dispense a reward to the exit port.

Preferably, the delivery assembly includes a housing that is disposed generally below the hopper that includes a delivery member chamber in which the delivery members reside, along with a delivery aperture. The delivery aperture is provided so that rewards can pass there through to enter the delivery chamber from a reward storage chamber of the hopper. The delivery assembly also includes a channeling member for directing rewards in the storage chamber of the hopper to the delivery chamber.

The roller preferably includes a first bristle-containing roller and a second bristle-containing roller. The first roller is rotatable about a first axis and the second roller is rotatable about a second axis. The motor includes a drive mechanism for causing rotary movement of the motor to result in the first and second roller rotating in a counter rotational manner to each other.

The motor is preferably capable of moving the rollers in a generally infinitely variable number of degrees of rotation that range from a fictional turn, to a multi-turn rotation.

Through this infinitely variable number of degrees of rotation, the device can ensure a precise delivery of a desired amount of rewards.

The controller preferably includes a wireless receiver for receiving remote commands transmitted by a wireless transmitter and acting on the commands to actuate the motor to move the delivery members to thereby dispense a reward to the exit port. The animal training device can also include an animal interactive device that can engage in an interaction with an animal to be trained. The animal interaction device includes a wireless communicator for wirelessly communicating commands to the controller of the animal training device. A base member can be provided on the animal control device that includes a bowl portion for catching the rewards dispensed from the exit port. The interactive device can comprise a play device that the animal can interact and play with, to learn the desired skill or skill set.

In accordance with another embodiment of the present invention, a treat dispenser is provided having a central unit, around which other devices are communicatively coupled for performing different functions. Generally, these other auxiliary devices are grouped into three broad categories, including input devices that feed some information to the central unit about the animal, such as its location or position; output devices that perform a certain function based on a signal being sent to it by the command device; and command devices, such as manual controls, Internet-based command devices, Smart phone-based devices, voice actuation devices and computers, that enable the user to provide commands to the reward dispenser and the various input and output devices.

In accordance with another embodiment of the present invention, user programmable software is provided, so that the user can design and implement his/her own training regimes for the animals, or can design their own regime to cause their animals to perform specific tasks, or a way of providing unwanted behaviors. This programmable training regime may be configured as an artificial intelligence-based training regime, a sensor device is employed for environmental inputs, and a command key for enabling the user to program the various reinforcement dispensing devices to react in connection with these environmental inputs.

For example, the environmental sensor portion of the device can record the sound of a door bell ringing, and then record the sounds that occur thereafter. If the user is trying to train the dog not to bark every time the doorbell rings, the sound of a ringing doorbell would trigger the environmental sensor to determine if a barking sound was heard thereafter. If the sensor sensed a barking noise, the device would not yield a treat. However, if no barking followed, the device would yield a treat.

One feature of the present invention is that it incorporates the use of a feeder that is capable of precisely dispensing a wide variety of various treat components to the dog, upon command. This feature has the advantage of enabling the user to provide a reward to the dog or animal that is consistently and accurately dispensed, and to enable the user to employ a wide variety of different types of treats with which to reinforce the dog.

Another feature of the present invention is that it provides the user with a greater flexibility in designing training regimes and programs.

It is also a feature of the present invention that it can include a user programmable function. This user programmable function has the advantage of making the device instantly flexible and easily useable by a user, to design commands and training regimes that are desirable to the user.

These and other features of the present invention will be discussed in more detail upon a review of the drawings and detailed description of the preferred embodiments of the present invention set forth below which describe the best mode of practicing the present invention perceived presently by the Applicant.

IV. BRIEF DESCRIPTION OF DRAWINGS

V. DETAILED DESCRIPTION OF THE INVENTION

Figure 1:
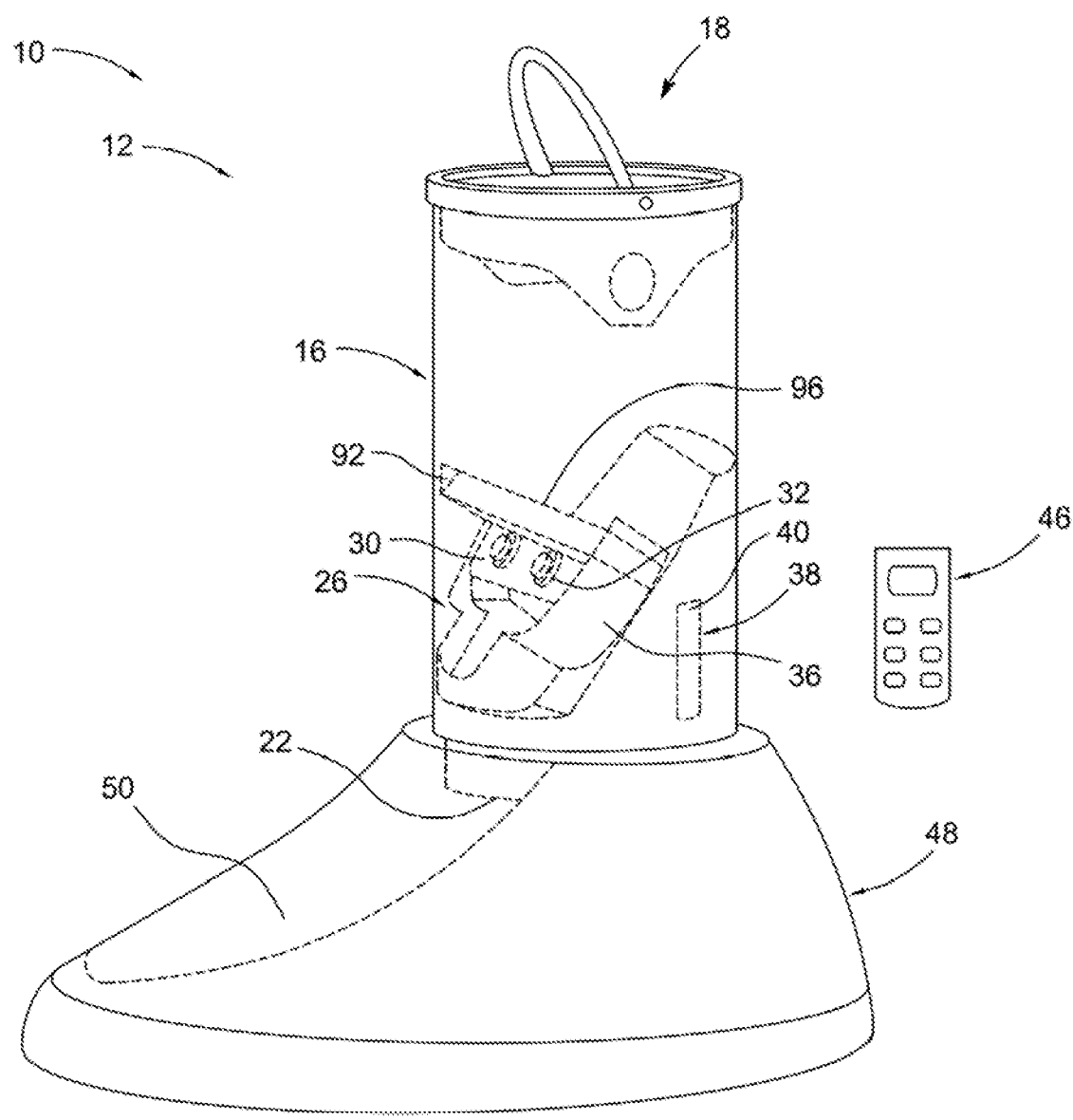
FIG. 1 is a perspective view of the invention taken from generally the left front side of the training device showing the delivery assembly in cut-away.

An animal training device 10 of the present invention is shown in the figures. The animal training device 10 includes as its primary component, a reward dispenser 12 that is capable of dispensing a reward to an animal being trained on receiving a reward dispensing command. The reward dispenser 12 includes a hopper 16 for holding a quantity of rewards, such as several cups of dog kibble-like-like treats or the like. As used herein, the term "rewards" and "treats" are used in their broadest sense. The most common "treat" or "reward" that normally is used for the animal would comprise some sort of food reward, and preferably, some sort of snack-type food reward of the type that an animal would be most interested in eating. However, the reward can comprise anything that is attractive to the animal and is ultimately consumable.

The reward or treat should be consumable, as it is envisioned that the owner, during a training cycle, will give several treats to the animal over the period during which it is being trained. If the reward is not consumable (whether through eating, breakage, destruction, etc.), but rather is permanent, the animal will have no incentive to perform an action to receive another reward, since the animal will already have a reward to play with. For example, if the reward tendered was a virtually indestructible chew toy, it is likely that the animal would not be motivated to perform any further action so as to cause the dispensing of another chew toy, since the animal has the first chew toy to play with.

As will be appreciated, food constitutes a preferred reward, because it can be varied over a wide range of foods, can be varied over a wide range of sizes, and can be varied over a wide range of shapes. This variation in shapes, sizes and types enables the user to choose a reward that not only works well within the reward device 12, but also constitutes a reward that the animal likes. Additionally, the food is a consumed item. Preferably, the size of the treat is chosen so as to not fully satiate the animal, thus enabling the owner to motivate the animal through the serial dispensation of reward treats over a short period of time.

The hopper 16 has a hollow interior, and is provided for holding a quantity of rewards. The hopper 16 includes an entrance port 18 for receiving rewards, and an exit port 22 at its lower end of the hopper 16, through which rewards can be dispensed. The entrance port 18 is placed at the top, and the exit port 22, is at the bottom, to take advantage of the ability of gravity to move rewards through the machine toward the lower exit port 22. A delivery assembly 26 is provided for controllably delivering rewards from the hopper 16 to the exit port 22. The delivery assembly 26 includes a movable delivery member, such as first and second bristle-containing, rollers 30, 32 that are placeable in contact with the rewards to be delivered. The delivery assembly 26 also includes a motor 36 that is operatively coupled to the delivery member's first and second rollers 30, 32 and is capable of maintaining the rollers 30, 32 in a static position to prevent the delivery of a reward. The motor 36 is also capable of moving the delivery members 30, 32 to deliver at least one reward to the exit port 22.

The delivery members 30, 32 are bristled rollers and preferably, include bristles that are about ½ to ¾ inch in length. The rollers 30, 32 are positioned to make the bristles inter-engageable when the two rollers 30, 32 are positioned in the delivery assembly 26. The bristles of the rollers 30, 32 should be sufficiently stiff and thick, so that when the rollers 30, 32 are in a static position, the bristles will maintain the rewards from passing between the rollers 30, 32, and out through the exit port 22. However, when the bristles and rollers 30, 32 rotate, they should be flexible enough to "grab" a treat and allow it to pass through the rollers 30, 32 through the frictional engagement between the bristles and the reward. A controller 38 is capable of receiving a command and actuating the motor 36 upon receipt of the command to thereby move the delivery member rollers 30, 32 in a counter rotational manner to thereby dispense a reward to the exit port 22.

The device can also include hopper mounted control button 40 for controlling the operation of the device 12. As shown in FIG. 1, three "buttons" are shown. Although all three of the buttons can be control buttons, the buttons can be more numerous or less numerous, and used for alternate purposes. One of the staus lights can be a light or gauge to indicate either operation, or that the device 12 is on.

Further, a second status light could be a level indication light or gauge that would indicate the level or rewards within the hopper 16, or alternately, could be an infrared signal receptor or radio receiver for receiving an infrared or radio signal from a remote command device such as remote command device 46. As will be discussed in more detail below, the remote command device 46 can be something as simple as a two or three button remote control device (e.g. on/off; start-dispensing; stop-dispensing) or can be a much more complicated device that is capable of sending more complicated commands to the dispenser 12. An example of such a more complex command device is a more complicated remote, or a Smart Phone.

Figure 2:
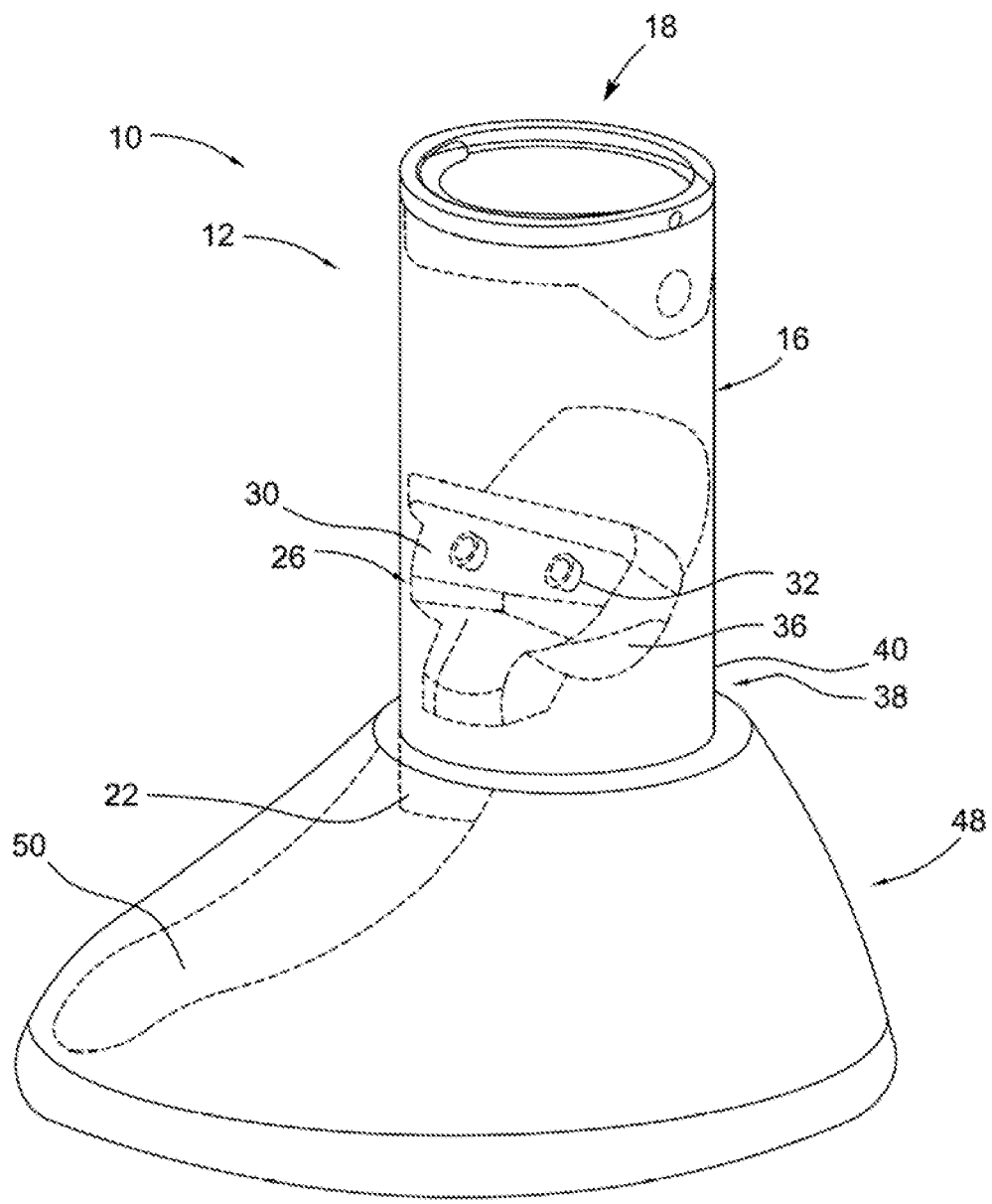
FIG. 2 is a perspective view, similar to FIG. 1, except rotated slightly to show more of the front of the device showing the delivery assembly in cut-away.
Figure 3:
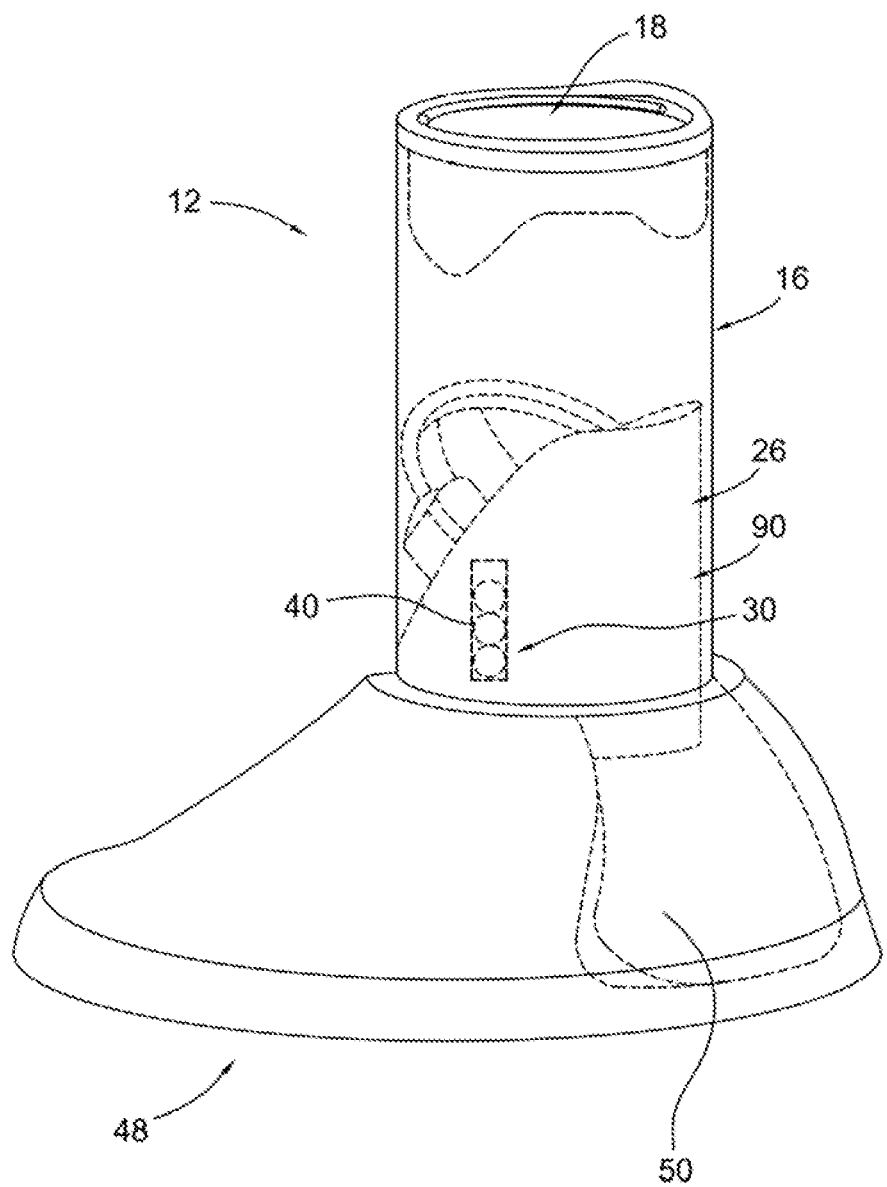
FIG. 3 is a perspective view, similar to FIG. 2, except wherein the device is rotated relative to the base, so as to show more of the rear left side of the device showing the deliver, assembly in cut-away.

As shown in FIGS. 1 and 2, the device 12 is provided with a base 48 on which the hopper tube 16 rests. The base is provided for supporting the hopper cylinder 16 and the remainder of the device 12 in a generally upright position. The base includes a hopper receiving portion that is designed to be matably engageable with the lower portion of the hopper cylinder 16. The base also includes a bowl portion 50 for receiving rewards that are dispensed from the exit port 22, and keeping the rewards within a confined area so that the animal can eat them.

Preferably, the base 48 is designed to be made from a plastic material. The base 48 should also have a broad enough bottom so as to provide a stable platform for the device 12, when the reward dispensing device 12 is placed on a horizontal surface. In most cases, it is expected that this surface will be a floor, but the surface could also be an elevated surface, such as a counter top, veterinarian's examination table, or a barn loft floor, or a cage loft floor.

Figure 5:
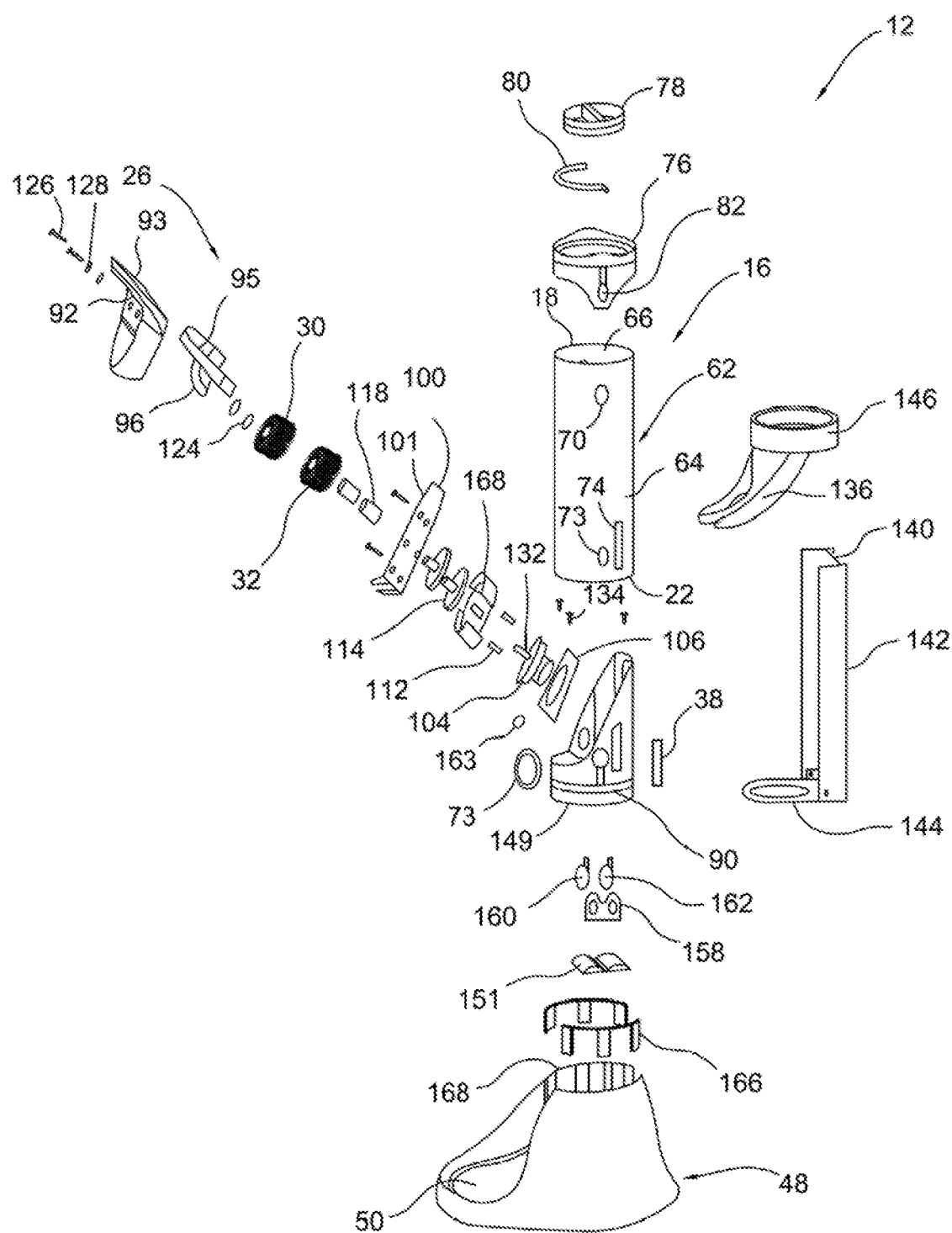
FIG. 5 is a exploded view of the present invention showing its various component parts

The hopper 16 and its component parts are best shown in the drawings and are particularly well shown in FIG. 5.

The hopper 16 includes a generally cylindrical, hollow outer tube 62, having an entrance port 18, and an exit port 22.

The outer tube 62 of the hopper includes a cylindrical outer wall 64 that faces radially outwardly, and a cylindrical inner wall 66. The cylindrical inner wall 66 faces radially inwardly and defines a reward receiving and storage space within the interior of the hopper tube 62.

An upper aperture 70 is formed in the hopper cylinder 62 for receiving an engaging member of the end cap 76, and a lower generally circular aperture 72 is provided for receiving and housing a speaker such as speaker 73 and/or jack assembly. Additionally, a generally rectangular control button receiving aperture 74 is provided for receiving the control button array 38.

As the control button array 38 is ultimately mounted to the bottom housing 90 of the dispensing assembly 26, the outer surfaces of the buttons and/or lights of the control button display 38 need to extend outwardly through the cylindrical hopper tube 62, so that they can either be actuated (in the case of buttons) or seen (in the case of lights) by the user of the device.

An outer tube end cap 76 is sized and configured for being received in the entrance port aperture 18 of the hopper tube 62. The outer tube end cap 76 has an aperture therein for receiving the removable cap 78, that is preferably screw or bayonet mounted to the end cap 76, and is designed for easy removal and replacement, to facilitate the user opening and closing the entrance port 18 of the hopper, to add additional kibble-like when necessary. However, it is also designed to be "animal proof" so that it cannot be opened by an animal.

The outer tube end cap 76 includes some downwardly extending ears that include engagement members 82. The engagement members 82 can include a spring loaded detent type member, and preferably include a button type member that extends radially outwardly, so that the pair of opposed engagement member buttons 82 extend through the apertures 70 of the end tubes 62, to thereby fixedly, but removably couple the outer tube end caps 76 to the hopper tube 62.

A wire form hanger member 80 is provided that includes a pair of tabs that are insertable through apertures formed in the end cap 76. The handle 80 is coupled to the cap 76 to enable the user to carry the hopper easily.

The dispenser assembly 26 includes a bottom housing 90 that is preferably formed from an injection molded plastic, and an upper housing 92. The lower 90 and upper 92 housings can be joined together to form a housing having an interior motor receiving chamber in which the motor 104 is disposed. In addition to the motor, the controller, along with an radio receivers and transmitters and other associated electronics are disposed in the motor receiving chamber of the housing. The motor receiving chamber is designed to be sealed off from the exterior of the dispenser assembly 26 to prevent treats, water and other contaminants from entering the interior of the motor housing chamber, to thereby better protect the components that are stored therein.

A movable floor 96 is slidably coupled to the upper surface of the upper housing member 92. The moveable floor 96 includes a generally planar lower surface that is disposed in a parallel plane with the planar upper surface of the upper housing member 92. The moveable floor 96 is moveable so that the movement of the movable floor 96 helps to "shake" the treats that are resting on the movable floor 96, to help urge the treats into a delivery member chamber that houses the rollers 30, 32 when the housing is assembled.

Figure 6:
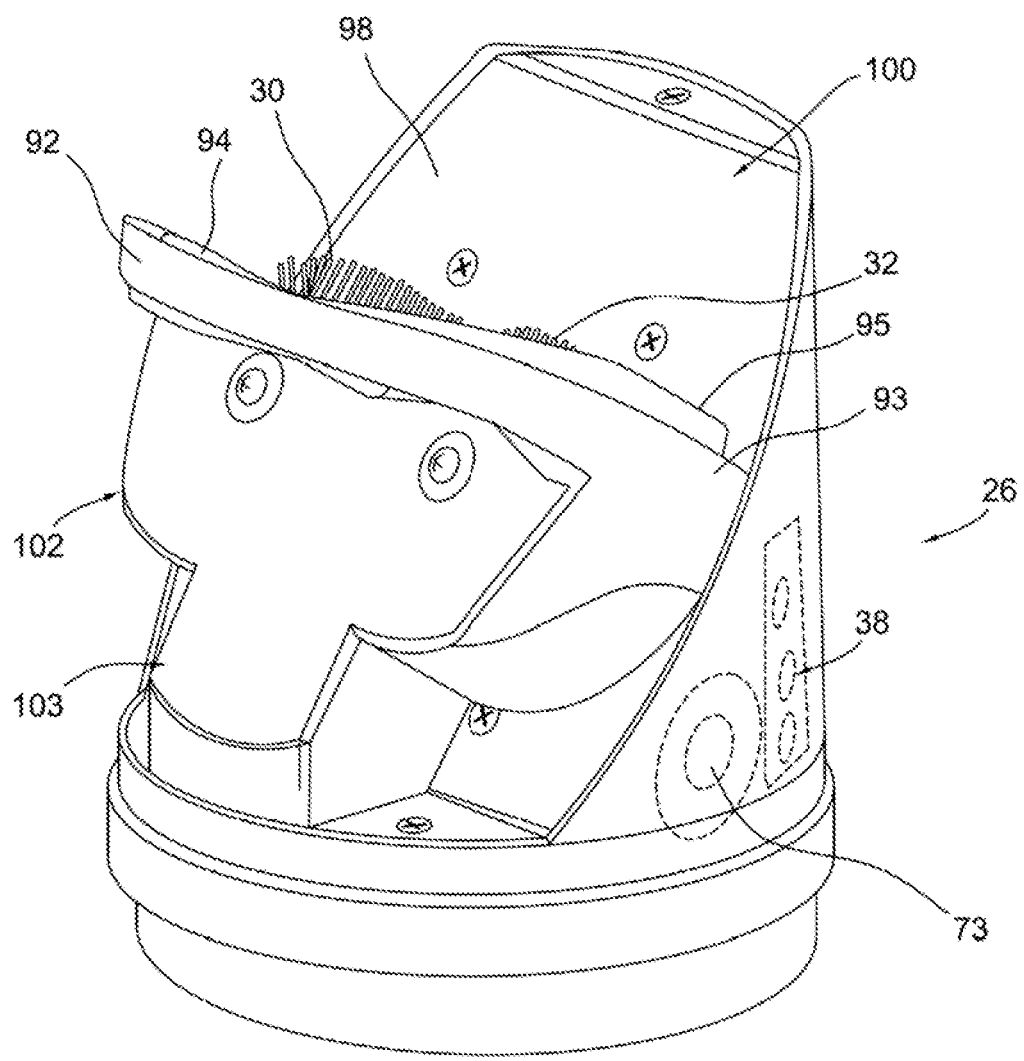
FIG. 6 is a perspective view of the delivery assembly of the present invention.
Figure 7:
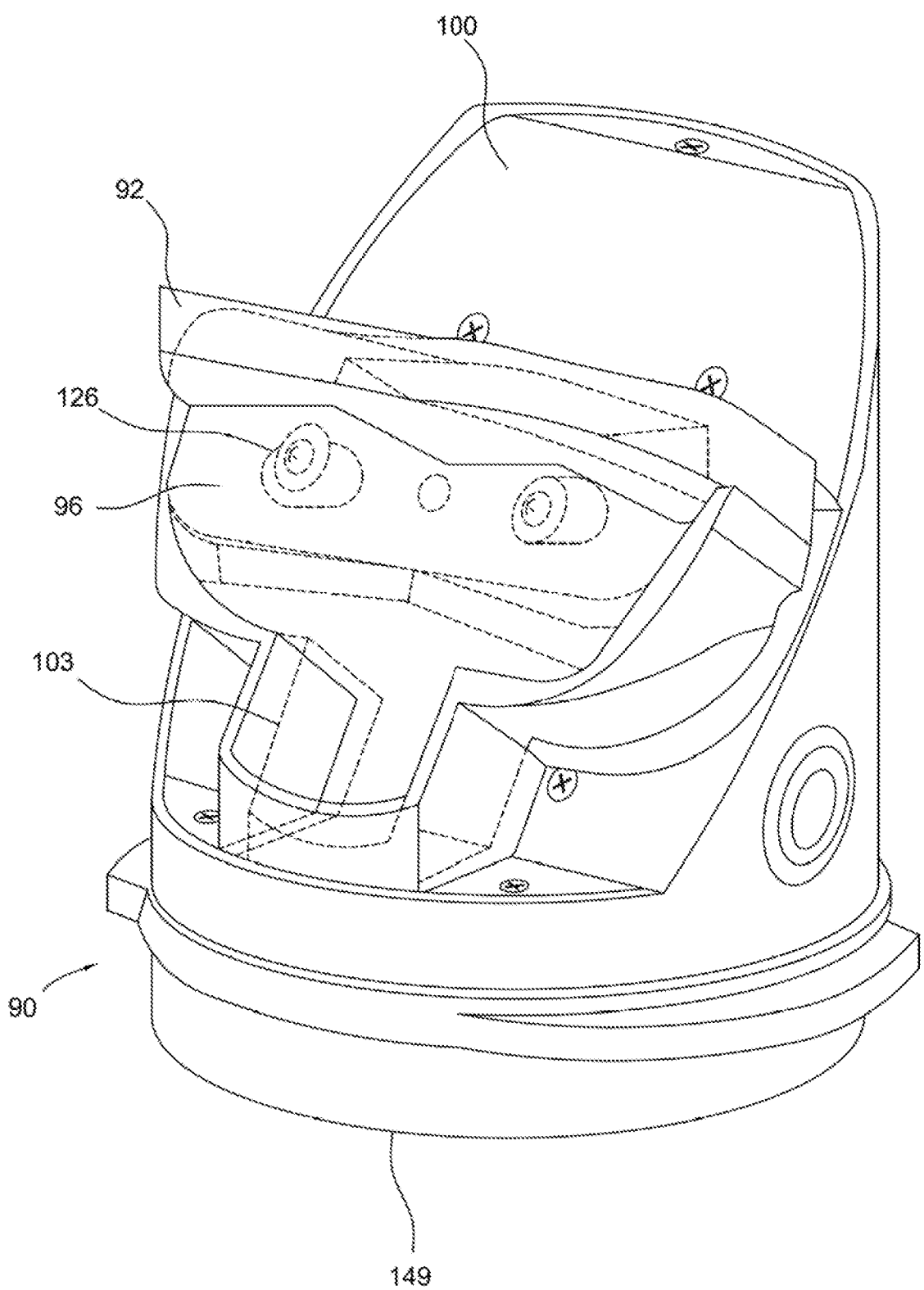
FIG. 7 is a perspective view of the delivery assembly of the present invention, wherein the delivery member cover is removed to show the delivery members contained therein.

A motor bracket 100 is disposed at an oblique angle to the upper surfaces of the upper housing member 92 and moveable floor 96, such that as best shown in FIG. 6, the upper surfaces 93, 95 of the upper housing 92 and movable floor 96 are disposed in a plane that is almost perpendicular to the upper surface 101 of the motor bracket 100. As shown in FIG. 6, the upper surface 101 of the motor bracket 100 and upper surfaces 93, 95 of the movable floor and upper housing member 92 create an angled channeling member that effectively comprises a V-shaped bottom to the storage chamber in which the treats are stored.

This V-shaped bottom helps to employ gravity to help move the treats into engagement with the rollers 30, 32 to thereby foster the flow of treats through the rollers 30, 32, and ultimately, through the exit port of the housing.

Continuing onward with FIG. 6, it will be noted that the upper housing member 92 includes a relatively broader roller containing portion 102 that is generally wide enough to contain both of the rollers 30, 32 and an exit chute portion 103 that is disposed generally centrally and below the upper portion 102, and helps to define the cavity or exit chute through which the treats exit the delivery assembly 26. The motor bracket 100 is provided as a bracket to which the drive motor 104 is coupled.

Drive motor 104 is preferably a small DC motor that is capable of being driven by batteries. Along with the motor, a printed-wire-assembly PWA 106, along with a gear cover mount 108, that is provided for serving as a cover for the gears 114 provided for translating the rotary movement of the motor 104, into rotary movement of the rollers 30, 32 such that the rollers 30, 32 rotate in a counter rotational manner. Along with the gears 114, a pair of brush hubs 35 are provided for serving as spindles for the rollers 30, 32, and a pair of brush hub end caps 124 are provided that can be coupled to the distal end of the brush hubs 118, for securing the rollers 30, 32 onto the brush hubs 118.

Sensors 112 are provided for helping sense the position of the motor, along with the amount of movement of the motor. The gears 114 should be designed so that rollers 30, 32 rotate in a counter rotational manner, such that the rotation of the rollers 30, 32 helps to push treats through the space that is formed between the first and second rollers 30, 32.

Thread forming screws 138 and washers 139 are provided that can extend through the housing 92, and floor 95 for coupling together the housing and the floor. Additionally, the screws 138 can extend through the caps 124 and into the brush hubs 118 so that the upper housing 92 and floor 95 are coupled to the rollers 30, 32 and ultimately, to the motor bracket 100. Nonetheless, it is important that the devices are coupled so that even though the screws 126 do not rotate relative to the device, that the rollers 30, 32 be capable of rotating relative to the screws 126 and other members of the dispensing assembly.

Other components of the dispensing assembly 26 include a roll pin 132 and flat head screws 134 that are provided for attaching the PWA 106 to the gear cover mount 108.

Figure 4:
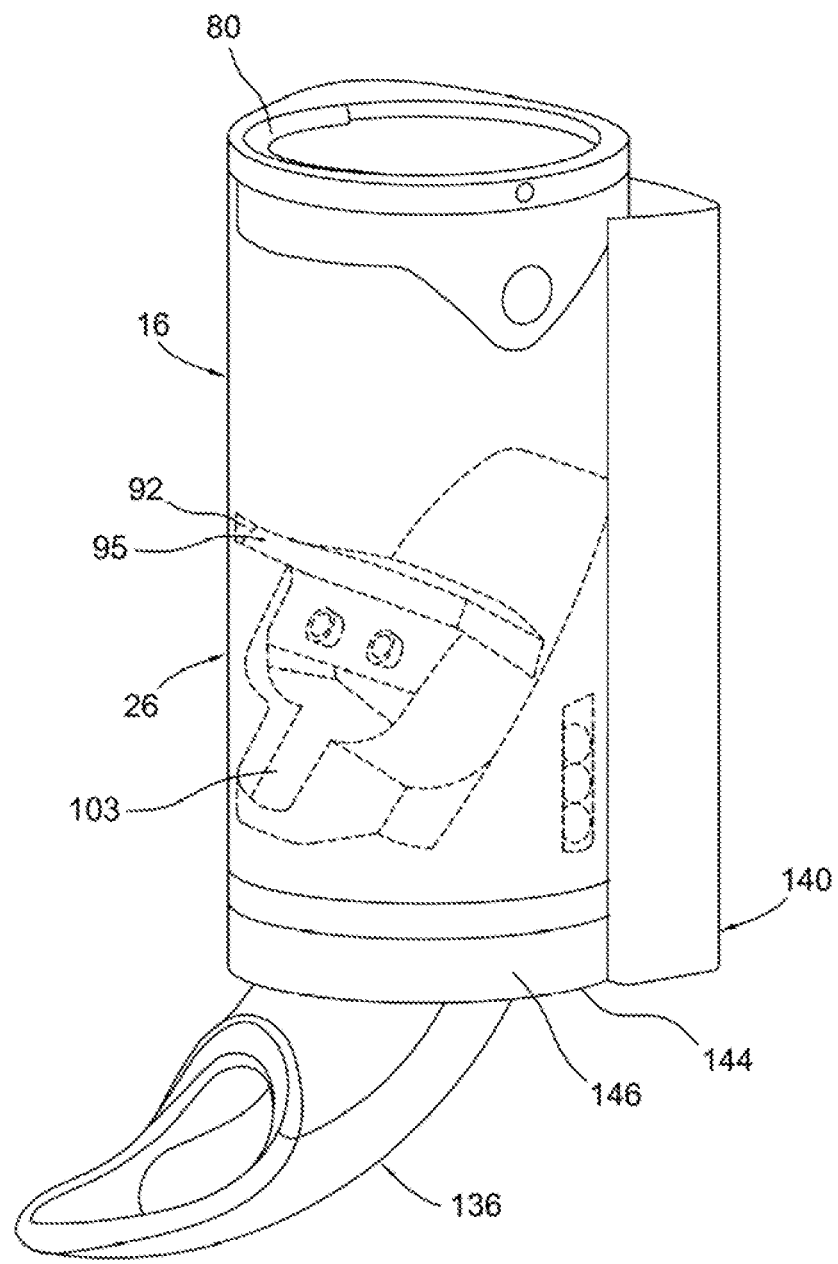
FIG. 4 is a first alternate embodiment of the device, showing the device with a delivery chute, rather than a base and mounting hardware for mounting the device on a device mounting object such as a cage or wheel chair, patient bed, car door, etc. showing the delivery assembly in cut-away.

An exit chute 136 is shown in the figures that is used in connection with the alternate embodiment that is shown in FIG. 4. The exit chute 136 is provided for use in connection with the device 10 when the device is not placed upon base 48, but rather mounted to a mounting object such as a cage.

A mounting bracket 140 is shown in the figures as including an upstanding support member 142 that is sized and configured to extend along the outer cylindrical wall of the cylindrical hopper 62, and a circular bottom bracket 144 that is ring-like in configuration and has a central aperture design to receive the bottom of the device, such as the underside surface of the lid-like connector portion 146 of the exit chute 136. In operation, the exit chute 136 is affixed to the bottom adjacent to the exit port of the device, so that treats that are dispensed from the hopper and the delivery assembly pass through the exit port and into the exit chute 136.

The lid-like cap member 146 is sized and configured for interiorly receiving the bottom of the delivery assembly housing 90 and being snugly attached thereto.

In order to couple the device 10 to the mounting bracket 140, the exit chute 136 is passed through the aperture of the ring-like bottom support member 144, with the underside surface of the lid-like member 146 resting on the upper surface of the ring-like member 144. Mounting screws (not shown) can be provided for attaching the ring-like member 144 to the mounting bracket 142. A variety of latch-like mechanisms can be coupled to the mounting bracket 140 for coupling the mounting bracket to the mounting object to which it is attached. Preferably, a universal type mounting latch would be employed, although mounting latches and connectors may need to be varied to better work with the device to which they are being attached.

For example, a mounting member that might work well to couple the device to the inside of a car door might have a mounting bracket that includes three angled planes to form a "U-shape", similar to the bottle and soft drink holder that are often employed to hold drinks in a car that include a planar member that is insertable in the space between the window and the window opening of a car, and that place a soft drink securely along the interior surface of a car door.

Figure 13:
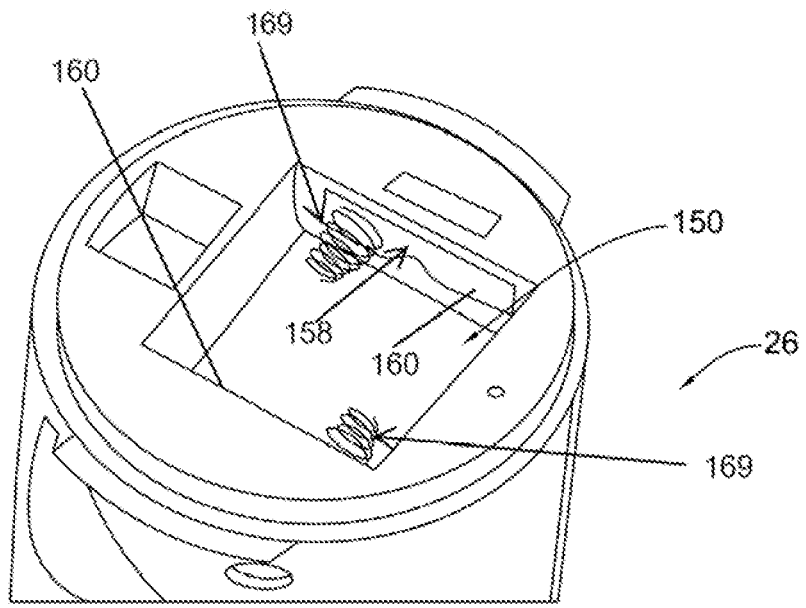
FIG. 13 is a bottom perspective view of the device showing the battery compartment.
Figure 14:
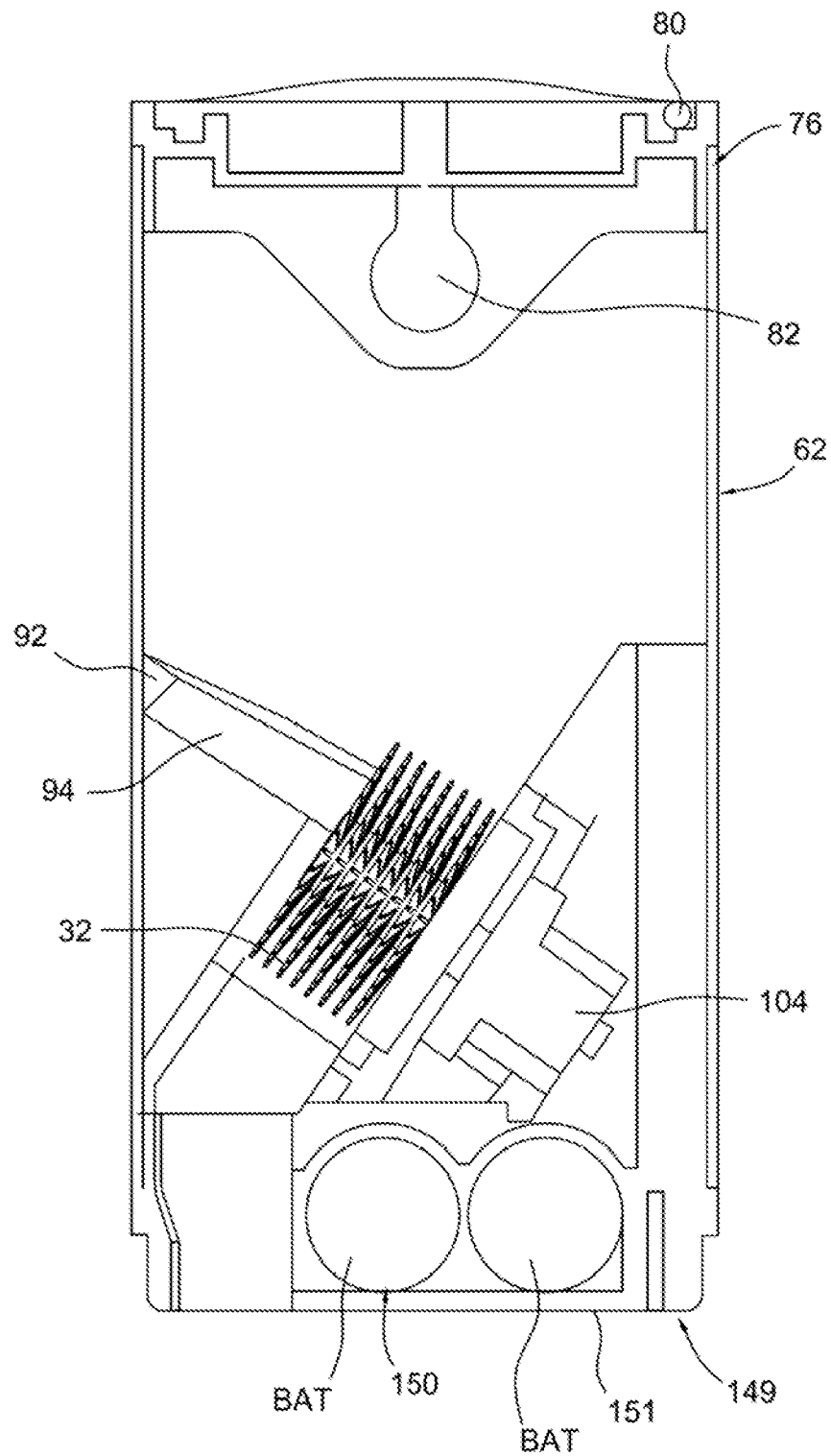
FIG. 14 is a side, sectional view of the device, showing the delivery assembly contained within the hopper.

The underside surface 149 of the lower housing 90 of the dispensing assembly 26 includes a battery compartment 150 (FIGS. 13 and 14) that is sized and configured for receiving a pair of batteries, such as a pair of AA or AAA batteries. The battery compartment includes a battery compartment door 151, a battery contact jumper 158, a positive battery contact 160 and a negative battery contact 163. The bottom housing member 90 can also include a coax jack, barrel connector 169 to which a variety of electronic devices and/or antennas can be connected, along with speakers 73. The speakers 73 serves as a transducer, and can serve as both of a speaker for transmitting sounds through the animal to be trained, and the microphone for picking up sounds emitted by the animal, or emitted within the environment of the animal, depending upon how one wishes to use the transducer 73.

The base member 48 includes the bowl 50 and a base bracket 166. The base bracket 166 is received by the generally cylindrical hopper 62 receiving portion 168 of the base 48. The hopper receiving portion 168 of the base member 48 is sized and configured to receive snugly, the bottom of the bottom portion of the bottom housing 90 of the dispensing assembly 26, and hopper 62, to securely support the dispensing assembly 26 and hopper 62 in a secure upright position within the base 48, with the large diameter underside surface of the base 48 serving to securely position the entire unit and base 48 on a horizontal surface such as a floor. When the device 12 is used in connection with the base 48, the exit chute 136 and mourning bracket 140 are not employed.

Figure 8:
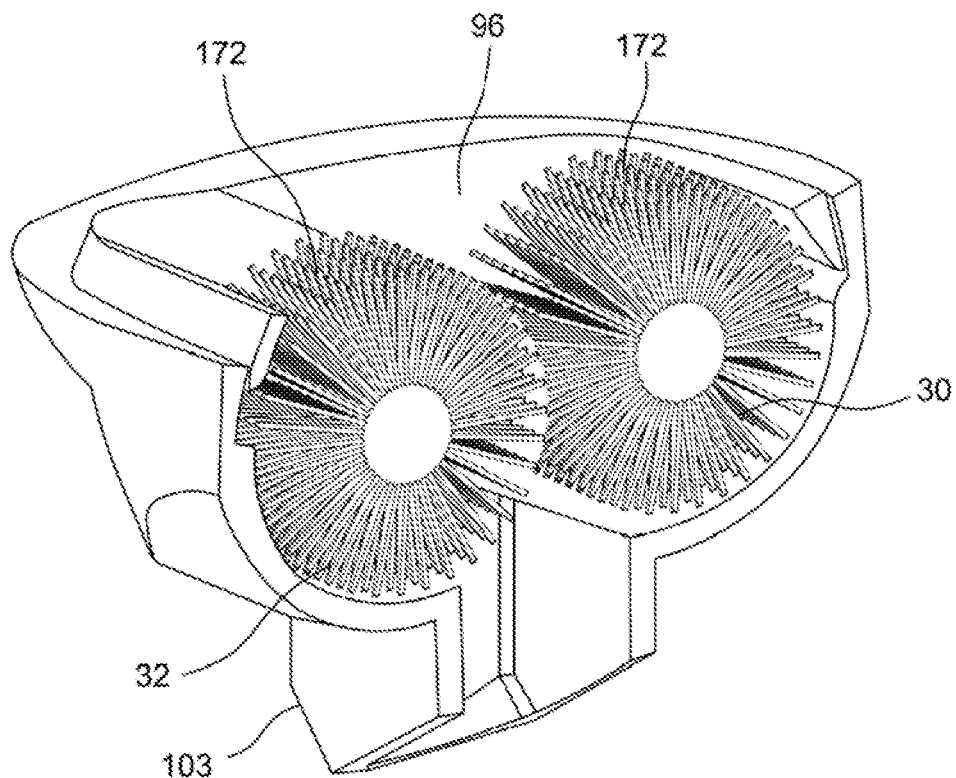
FIG. 8 is a perspective view of the delivery member and a portion of the housing that holds the delivery member.
Figure 9:
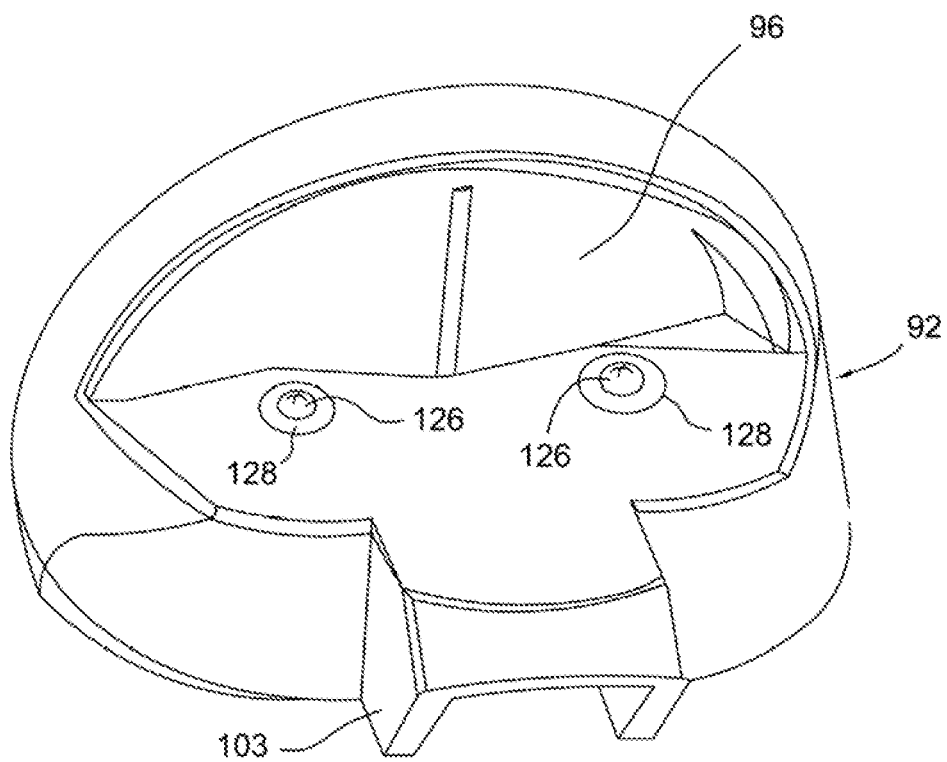
FIG. 9 is a perspective, back side view of the delivery member housing.
Figure 10:
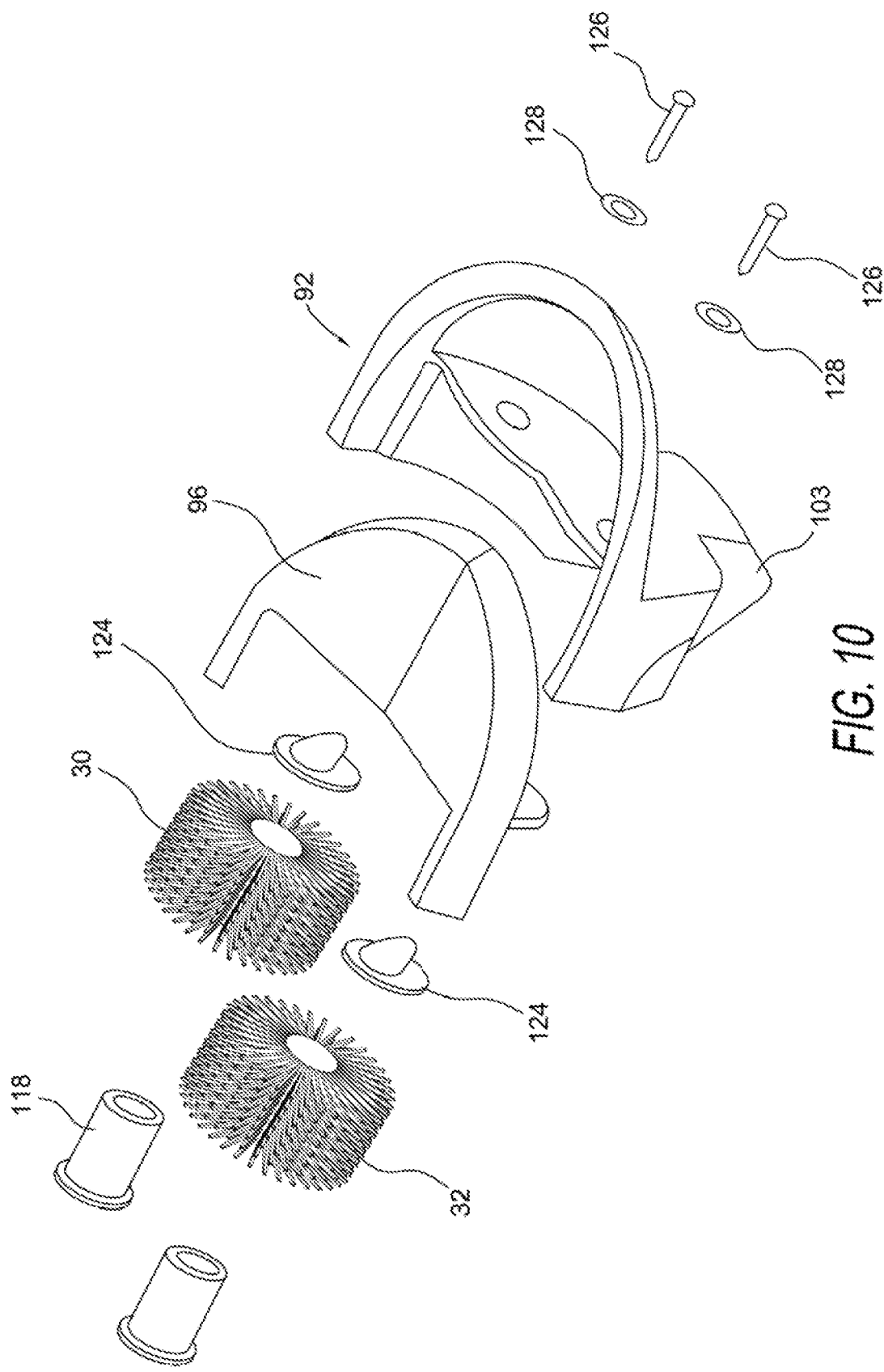
FIG. 10 is an exploded view of the delivery member housing.
Figure 11:
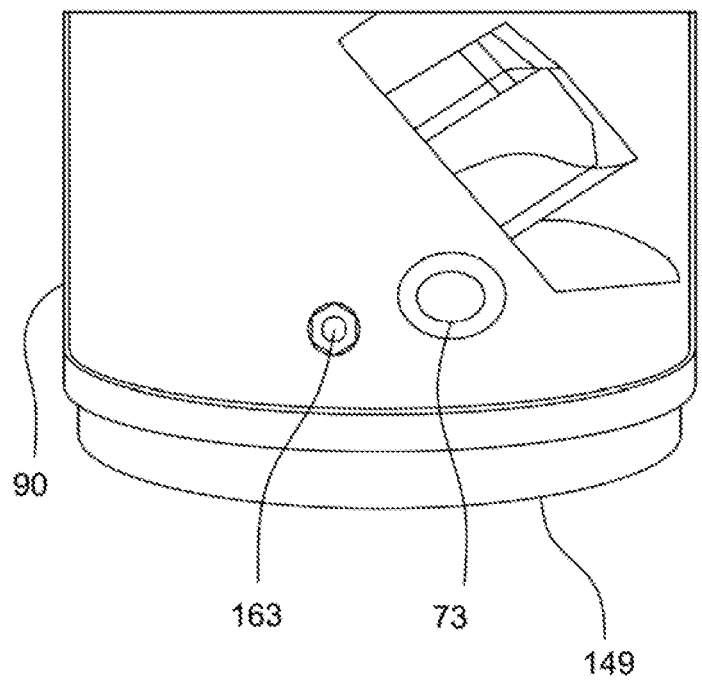
FIG. 11 is a side view of the device, showing the delivery member in cut away.
Figure 12:
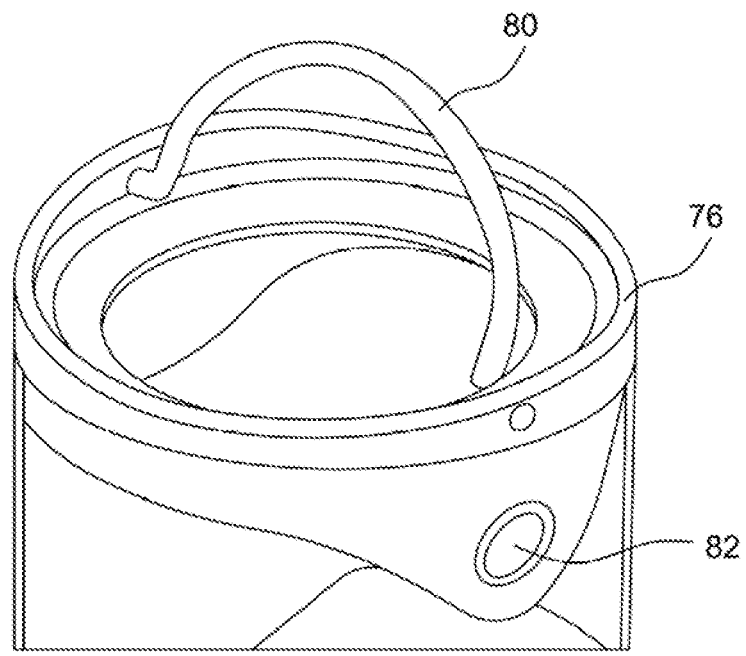
FIG. 12 is a perspective view of the top portion of the device, showing the hopper and the handle for the device.

Your attention is now directed to FIG. 8 that displays the roller 30, 32 and bristles of the rollers in perspective. The rollers 30, 32 each comprise brushes having a plurality of long, and closely spaced bristles 172. Preferably, the bristles 172 that are disposed on the first roller are identical to the bristles 172 that are disposed on the second roller 32.

As will be noted, the rollers 30, 32 are rotatable about an axis, such that the first roller 30 is rotatable about a first axis, and the second roller 32 is rotatable about a second axis. As shown in the most preferred embodiment, the axes of the first and second rollers are generally parallel. Additionally, the brushes are configured such that their position and the diameter of their bristles are such so that the bristles 172 of the first roller 30 are inter-engaged with the bristles 172 of the second roller 32. When the bristles are inter-engaged the inter-engagement of the bristles, when coupled with their length and resistance to bending result in the bristles being able to support the treats in the hopper 62 above the bristles 172 in a manner such that the treats cannot fall between the rollers 30, 32 when the rollers 30, 32 are disposed in a static position.

One type of bristle that has proven effective by the Applicant are the bristles that one finds on an FURREMOVER® lint brush. These bristles are plastic, cylindrical bristles 172 that have a length of approximately 0.75 inches. One feature of the bristles 172 is that the bristles are stiff enough and long enough to offer resistance to movement, so that treats being held in the hopper storage compartment are prevented from passing through the bristles 172 and out the exit port of the container 26. The bristles 172 therefore should be sufficiently stiff so that they will only allow treats or rewards to move through the bristles upon a rotation of the rollers 30, 32.

Preferably, the rollers 30, 32 and bristles 172 are designed so that they are capable of dispensing one treat unit at a time, and also so that they operate quietly and reliably. This ability to dispense a single treat chunk is helpful, as it enables the user to quantify the amount of rewards given by the amount of rotation of the rollers. By varying the amount of rotation of the rollers 30, 32, the user can vary or predictably vary and dispense a predetermined or desired number of treat members. The motor 104 is preferably a servo motor that is used to accurately rotate one, but preferably both of the rollers 30, 32 the appropriate number of degrees to dispense the appropriate amount of treats.

The number of rotations that the motor 104 can cause the rollers 30, 32 to take is infinitely variable. It will be appreciated that in some situations, the rollers 30, 32 will only rotate a fraction of a turn to only dispense a single reward unit or two. However, as the device 12 can also be used as a feeding mechanism, it will be appreciated that the user may wish to cause the rollers 30, 32 to rotate a multiple number of turns to dispense a multiple number of treats consistent with good feeding amounts for the animal.

Figure 15A:
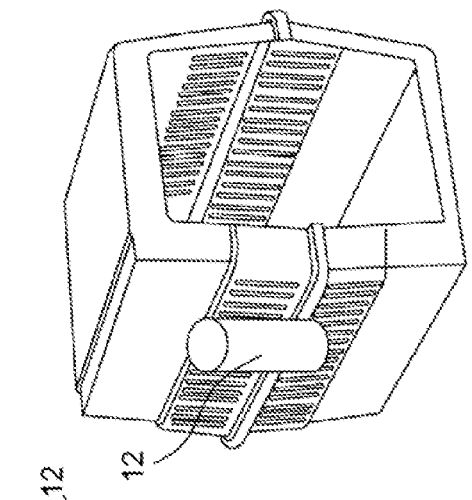
FIG. 15A is a schematic view showing the device used in a home situation resting on a floor.

The reader's attention is next directed to FIGS. 15A-15F. These figures show the device 12 of the present invention being used in a wide variety of circumstances. FIG. 15A schematically shows the device being used in a home situation, such as where the device 12 is placed within a base such as base 48 with the base being placed on a horizontal surface such as a floor.

Figure 15B:
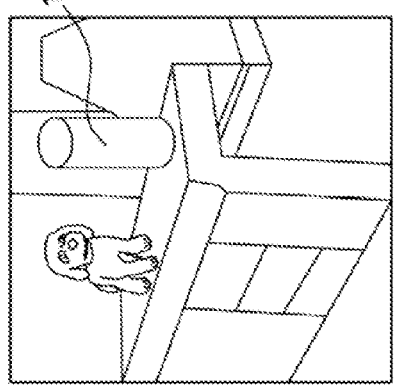
FIG. 15B is a schematic view showing the device being used on a veterinary table.

FIG. 15B shows the device 12 as being used on a vet or grooming table, to help the vet or groomer make friends with the animal to be examined or groomed, to thereby help reduce the fear and resistance that the animal expresses to the examination, treatment or rooming. When used on a vet table, the device can be used by placing the base 48 or alternately, the device 12 can be used by attaching it to a mounting member, such as mounting bracket 140, that is fixedly coupled to either an upstanding member or to a side of the vet or grooming table.

Figure 15C:
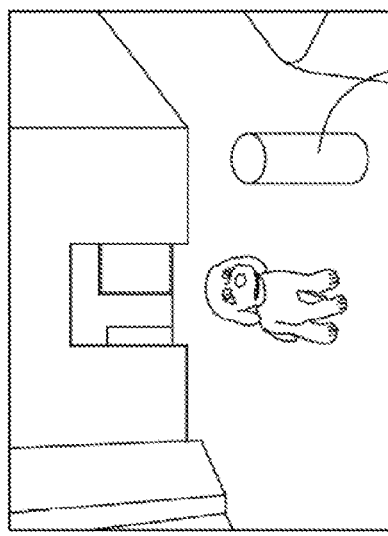
FIG. 15C is a schematic view of the alternate embodiment device shown as being mounted on to a dog crate.

FIG. 15C shows the device as being used on a side of a doggie crate. When used in the configuration shown in FIG. 15C, the device would likely be used with the chute 136 wherein the dispensing end of the chute would be replaced inside the crate.

Figure 15D:
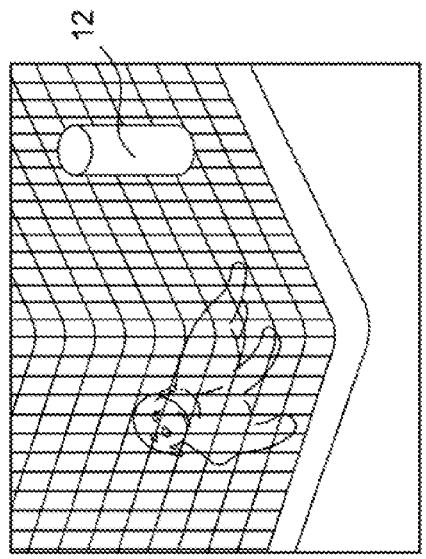
FIG. 15D is a schematic view of the alternate embodiment device of the present invention showing the alternate embodiment being mounted to a car door.

FIG. 15D shows the device being used inside a car or truck. When used inside a car, the device may be attached to a door or to the mounting bracket 140, or else especially adapted mounting bracket, such as a mounting bracket that includes a generally laterally extending planar member, and a generally vertically extending planar member that is sized and configured such that the vertically extending planar member can be inserted in a window sill between the window and the window track of the door, in much the same manner that a soft drink holder is mounted onto an automobile window sill.

Figure 15E:
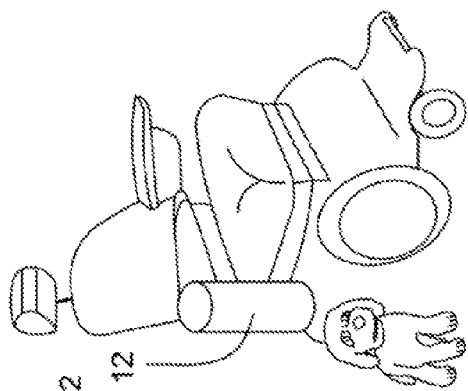
FIG. 15E is a schematic view of an alternate embodiment of the present invention showing the device being mounted to an electric scooter.

Turning now to FIG. 15E, the device 12 is being shown as being coupled to a mobility device, such as a scooter-type wheelchair. In such a configuration, the device may be attached to the scooter via a mounting bracket and would likely include an exit chute, such as chute 136 to dispense treats to the animal.

Figure 15F:
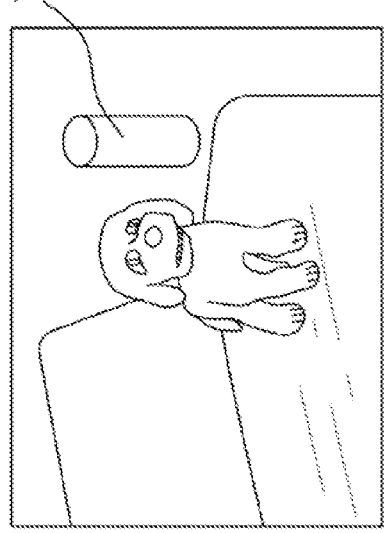
FIG. 15F is a schematic view of the device, showing the device as being mounted to a pet cage.

FIG. 15F shows the device 12 as being used on a cage, such as a pet cage that are typically found in a home. The device 12 is mounted so that the exit chute 136 extends inside the cage, to dispense treats to the interior of the cage. This cage and reward dispensing device 12 arrangement will be used to describe how the device can be used to train an animal to voluntarily go into its crate.

This training is accomplished preferably in three phases. The first phase is to attract the dog to enter the crate in the first place. This can be accomplished by the treat dispensing device controller actuating a speaker 73 to beep randomly, and to randomly drop treats within the cage or crate. Since the treats are dropped into the interior of the cage, the animal will need to go into the cage to retrieve its treats. This will serve the function of causing the dog to voluntarily go into the cage.

After the dog has been trained to enter its crate voluntarily, the device will shift off to phase two. In phase two, a proximity dispenser on the treat dispensing device is programmed to recognize when the dog enters the crate. This proximity device can comprise a sensor, such as a motion sensor having a detecting field that is configured to detect objects, such as dogs that are in close proximity to the crate. Alternately, the sensor can comprise a weight sensor, such as a pad having weight sensors therein that is positioned on the floor of the crate under a carpet or bedding for the animal.

The proximity sensor on the treat dispensing device 12 is programmed to recognize when the dog enters the crate. When the dog enters the crate, a reward is then dispensed to the dog or animal to reward the animal for going into the crate.

Once this second phase is complete, the device progresses to its third phase. The third phase is triggered by the dog being inside the crate. When this occurs, the device 12 rearms itself, and waits for the animal to leave the crate. After the animal has left the crate, the device then dispenses another treat when the proximity sensor senses that the dog is approaching the crate. This dispensed treat helps to lure the dog back into the crate. Another reward is then dispensed upon the dog entering the crate for rewarding the dog to enter the crate.

The reward dispenser 12 is placed to dispense rewards inside the crate and can also be used to help overcome the animal separation anxiety when the owner leaves the home. The timing of the treat dispensing and temporal point at which the treats start to be dispensed can be controlled by the user.

Other features of the device include the fact that the end cap 78 of the device is designed so that it is tamper resistant by the animal. In particular, there should be some sort of latching mechanism or secure closure mechanism to ensure that the dog cannot remove the cap from the end of the hopper tube, to thereby get at the kibble-like and eat the treat within the container.

The controller and the electronics contained within and used with the device 12 can vary from being rather simple to being rather complex. Preferably, the controller includes a speaker/transducer 73 that is capable both of serving as a microphone for picking up noise, and as a speaker for creating sounds, such as beeps, voice commands, marker signals and the like. The controller can include a Wi-Fi module so that the device can be operated through a wireless Internet connection. Additionally, the program should have memory and processing capabilities so that one can load programming into the controller so that the controller can operate the device, and, as will be discussed in more detail below, operate auxiliary devices if the controller is used as a command module for sending signals to a variety of associated devices.

The device 12 can be used alone or with a variety of other devices. For example, a plurality of treat dispensing devices can be set up along a predetermined course to teach the dog or other animal to travel along a predetermined course. These multiple devices are preferably independently controllable. Additionally, several devices may be desirable to use within a particular building or house, so that the animal can be trained to go to a particular location in the house.

By enabling the two treat dispensing devices to emit different sounds, the dog will learn to distinguish between a signal being emitted from the front door feeder and a signal being emitted from the bedroom feeder. Through this, the user may wish to train the animal so that when a person comes in the front door of a house, the unit within the bedroom would make a sound signaling to the dog that there was a treat in the bedroom, to thereby cause the dog to stay in the bedroom and not jump around near the front door of the house and possibly scare the guests or cause the owner to be in a position wherein she was required to restrain the dog while the owner was trying to talk to the guest.

In order to operate, software is employed to control the operation of the device 12. The software is designed to control the treat dispensing device so that it dispenses treats at appropriate times. Additionally, the software is designed to control the operation of the various sensors and other components such as speakers that comprise the system of the present invention. As discussed above, one of the acts that the device 12 may perform is to send a voice command to the dog. The delivery of this voice command might be made physically by a speaker 73, but the speaker 73 may be commanded by the software or control device to emit the voice control. Additionally, the software will receive inputs from sensors, such as position sensors, proximity sensors, temperature, environmental, noise sensors, microphones, etc., so that the device 12 can respond appropriately to these sensors.

Figure 16:
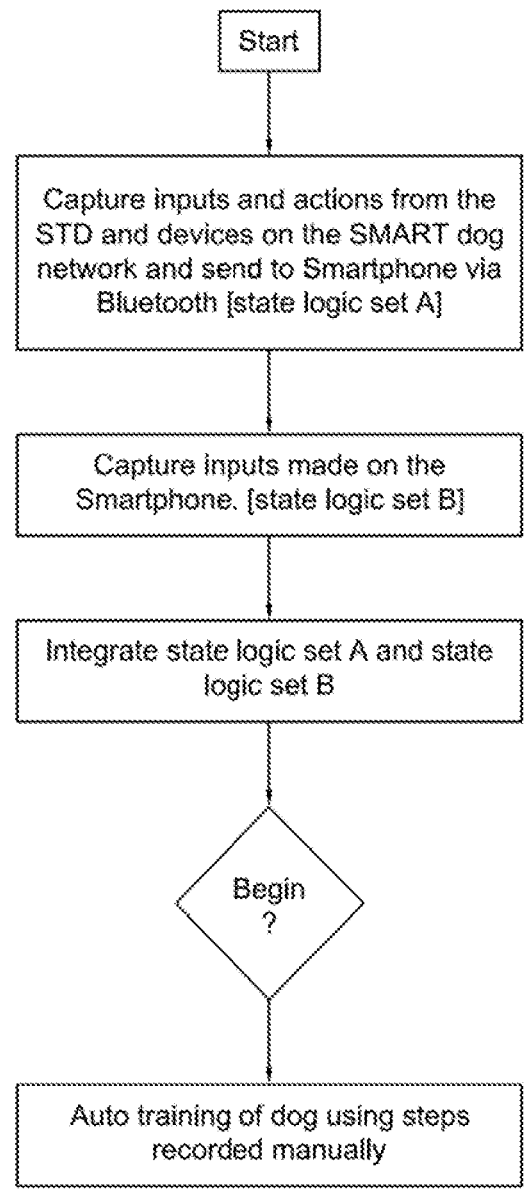
FIG. 16 is a flow chart view showing the applicant's general Follow Me Programming System.

The software is preferably operable in three modes, including an auto mode, a manual mode and an auto follow-me program mode (See FIG. 16). As used herein, the term "automatic mode" is used to describe what will likely be pre-programmed commands sets that will be given by the manufacturer to the user. It is envisioned that there are certain activities that most users will want to program their dogs to perform. These activities involve the interaction of such things as sensors for sensing various dog behaviors; output devices, such as speakers, toys and the like; and of course, the reward dispensing device 12.

The software in the automatic mode coordinates the operation of the treat dispensing device, input devices, and output devices to perform a training regime to cause the dog to either perform a desired action, or to avoid performing an undesirable action. It is likely that various programs and training regimes will be written and prepared for the device not only by the Applicant, but also outside programmers and developers, in much the same way that areas outside developers have developed programs for other computers, and programmable devices, such as iPhones, iPads, Smart phones and tablets.

In the manual mode, the device operates much like a remote control on a TV. In particular, the device 12 permits the user to actuate various commands depending upon the user's desire. For example, the user can give a first command by pushing a first button and causing the speaker to issue a voice command to the dog such as "sit". The user can then issue a second command by pushing a treat dispensing button to cause the treat to dispense from the treat dispensing device upon the dog successfully sitting. In such a case, the device would be used as effectively an extension of the user's will, at a particular time.

The third mode in which the device may be used is in the auto "follow-me" programming mode. The follow-me programming mode is a mode wherein the user has the capability of programming the device to perform whatever functions or commands the user wishes to have the device perform, to induce a certain action or in-action on the dog's behalf. The follow me mode is best shown in FIG. 16.

In the follow-me programming mode, the device essentially works in the manual mode, so that the user can input commands in conjunction with the device picking up and recording sensory information, so that the sensory information received by the sensing device can be coordinated with the commands given by the user. As an example, in the follow-me program method, the sound receiving sensors (e.g. 73) are activated to receive environmentally related sounds inputs. The device then records a particular desired triggering noise, such as a door bell being rung. Upon the doorbell being rung, the device continues to pick up sounds.

If the dog behaves as desired (by not barking), the input sounds that the device 12 picks up will primarily be general ambient background noise. After a certain period of receiving only ambient background noise (or at least not receiving barking noises), the user may then push the manual dispense treat mode. This sequence of events would then occur and be recorded by the processor of the controller or a separate computer. The computer device is then programmed so that when the sound sensors device detected the sound of a door bell ringing, the device is programmed to dispense a treat to the dog, in response to not hearing the dog barking.

In contrast, if the triggering sound is the door bell ringing, and the microphones from the device pick up the sound of the dog barking, the user should program the device 12 not to dispense a treat to the dog. By placing these two sequences of action together in conjunction with each other, the device 12 would then be able to have a user program training sequence for the dog.

In this sequence, the triggering noise (the door bell ringing), then results in either one or two things happening; (1) either the dog barks and the sensor picks up the barking noise; or (2) the dog does not bark and the sensor does not pick up any barking noise. Depending upon the reaction of the dog (whether or not it barked), a treat would be dispensed to reward the dog for the desired action being performed or not dispensed if the dog barked when the doorbell rang.

In addition to the training sequence discussed above, the auto programming feature may also be used or inducing a dog to perform such behaviors sitting, lying down, speaking or engaging any other behavior for which one may wish to train a dog.

Turning now to FIG. 16, a flow chart is shown that describes the auto programming features. At the start of the auto programming, the device is designed to capture inputs and actions from both the reward dispensing device 12 and the various sensors that are connected with the use of the device in the network. These various sensed environmental sound stimuli and the like are then sent to the user's Smart phone via a wireless connection such as blue tooth. The inputs are then captured by the smart phone and a recording of the inputs is made. The remote of the feeder can communicate with an iPhone or other Smartphone, PDA, or iPad-type device through its headset (audio) port. An audio frequency shift keying (AFSK) is used to transfer digital data between the remote and its connected devices, to the Smartphone device.

The inputs are then captured, and overlain with commands that are given to the Smart phone, so that the events of the Smart phone, such as the commands given to the treat dispensing device are laid over the sensory inputs so as to coordinate the inputs with the commands given by the Smart phone. After the program is fine tuned to work well with the particular animal, the program can then be used on its own to train the animal based on the combination of the inputs sensed by the sensors and the command response input by the user in response to those environmental sensors.

Figure 17:
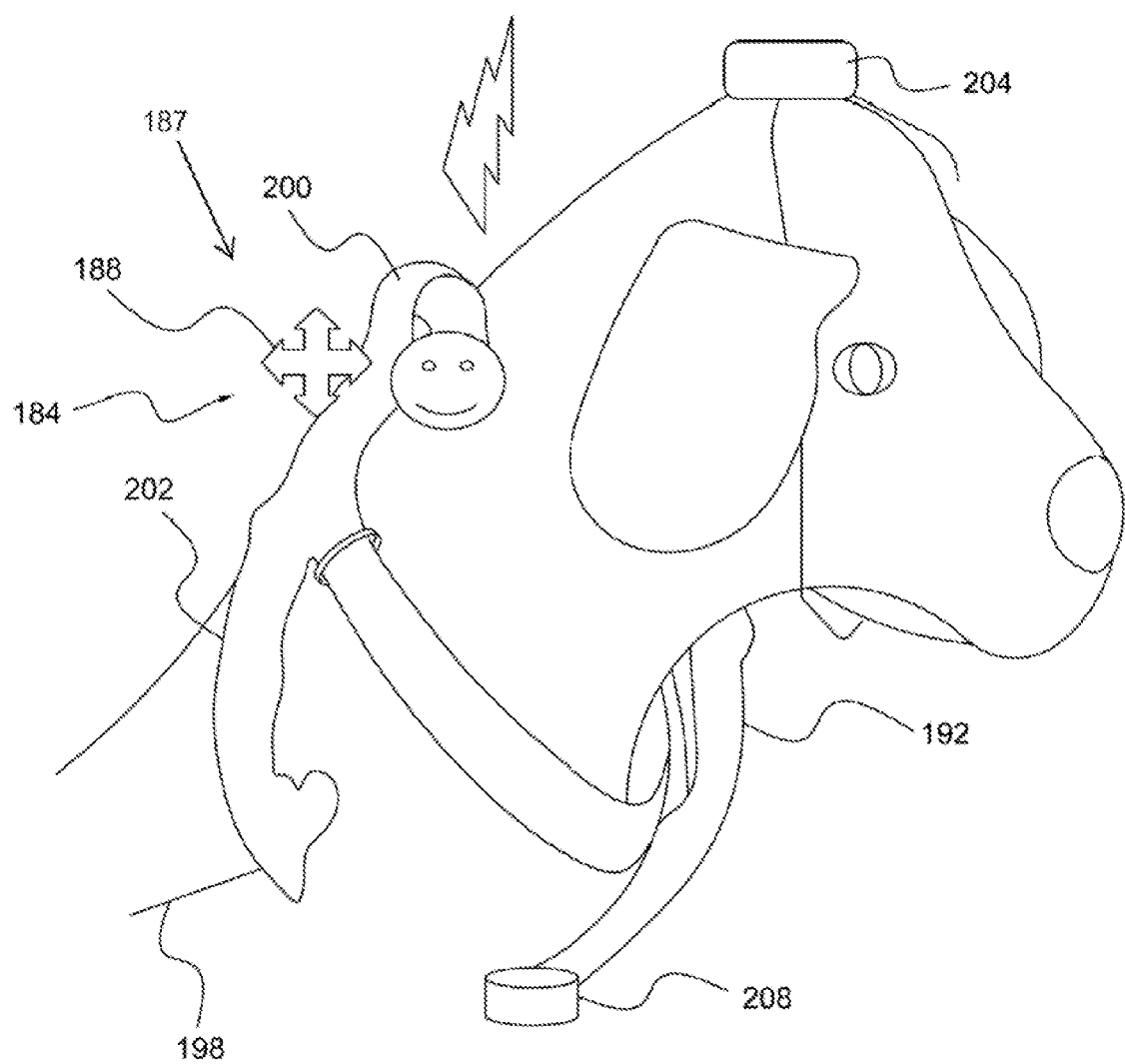
FIG. 17 is a schematic view of a pet wearable accessory useable with the present invention, and in communication with the present invention.

The device can include a dog telemetry pack that provides information relating to the position, location and movement of the dog. As best shown in FIG. 17, the dog telemetry pack 187 can include a plurality of components. Among the potential components is a three axis accelerometer 188 that is capable of helping to determine dog position, by determining the pitch, yaw, roll and general attitude of the dog D. The accelerometer 188 should be able to determine whether the dog D is standing up, by determining that the dog's back is generally parallel to the ground; or sitting by determining that the dog's back is generally approximately at a 45 degree angle to the ground.

In addition to the accelerometer 188 that comprises a position determining device for the dog, other sensory devices can be used. As shown in FIG. 17, the sensor devices are preferably mounted to a harness type device 192 on a dog. It is believed by the Applicant that the use of a harness 192 as a mounting platform for the sensor devices provides several advantages over a collar as a mounting platform.

For example, a harness 192 serves as a better platform for an accelerometer 188, and also gives better position readings when using an attitude sensing device. Also, a harness 192 provides more surface area contact with the dog so that more devices can be mounted.

In FIG. 17, the sensor devices are shown as being removably attachable to the harness 192. In this way, one can buy an off the shelf harness and connect one or more sensor components to the harness 192. The components so coupled to the harness 192 depend upon the components one has and the components one desires to couple to the dog D.

A second class of components that can be coupled to the harness are various sensors that sense the dog's physiological condition. These sensors include things such as heart rate sensors 198, breathing sensors 200, temperature sensors, and body temperature sensors 202. Further, a gyro compass 204 can be made a part of a dog telemetry pack 184 that can measure the direction of a dog's body, and in particular, the direction of the dog's head. A down stay detector 208 can also be provided to measure the distance between the ground and the dog D. The stay down detector 208 has particular applicability if one were trying to teach a dog D to lay down or stand up upon command as the distance from the ground would be a good measurement of whether the dog was in fact standing or sitting.

One advantage of the use of these sensors is that they allow the training of the dog to occur even when a human is not present. Because of the existence of the distance to ground stay detector 208, the user need not be present to determine whether the dog D is actually lying down or sitting up, as such would be determined by the device.

The various components of a dog telemetry pack 184 can be used in a variety of applications, including classical or operant counter conditioning, to reduce aggression or fear. For example, the device 12 could be designed to measure the heart rate of a dog, as heart rate is a precursor to the dog exhibiting aggression or fear. The device could be designed to dispense a treat to the dog in response to a sensed heart rate increase, to thereby help dissuade the dog from barking at a strange dog, or otherwise exhibiting aggressive behavior.

Additionally, by using a three axis accelerometer 188, the device 12 can be used to teach the dog to sit automatically by measuring the angle of a dog's back and rewarding the dog by dispensing a treat when the dog has achieved the sit position. The height sensor 208 can be used to help teach a dog to automatically lay down upon command.

In a preferred embodiment of the present invention, a plurality of animal interactive devices are provided with which the animal can interact to input data into the device 12. These input devices are included that the animal can interact with to actuate the device 12 to perform certain functions. Some of these animal input devices are illustrated in FIGS. 18A-18D, and include such things as a Smart target stick 214 that the dog D can actuate by tilting; a dog push button; a touch pad, such as an IPads that the dog can touch to initiate an action; and a lever pull (not shown), similar to a slot machine and a Smart tug toy FIG. 18C.

Figure 18B:
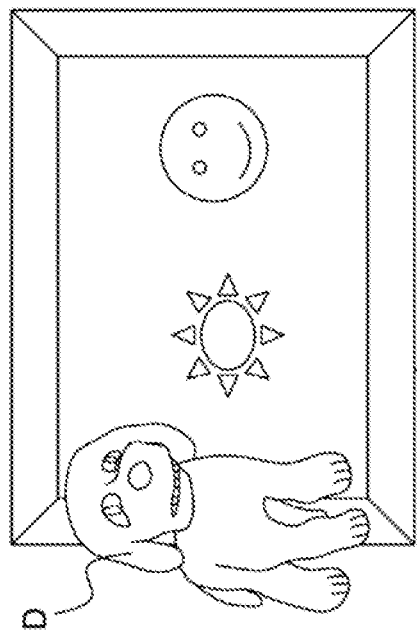
FIG. 18B is a schematic view of a Touch Screen interactive device of the present invention.
Figure 18D:
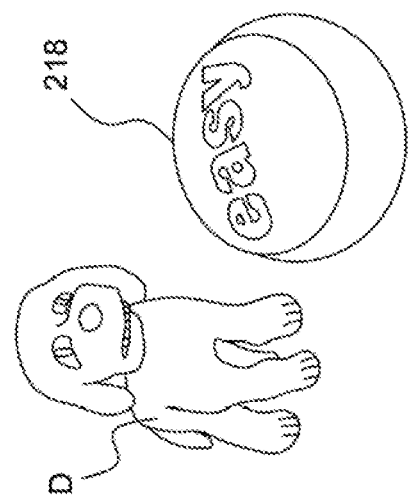
FIG. 18D is a schematic view of a push button type pet interactive device of the present invention.
Figure 18A:
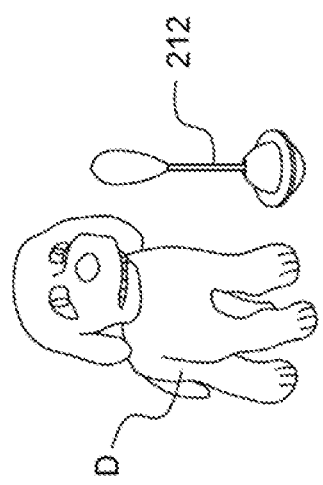
FIG. 18A is a schematic view of a Smart Card type pet interactive device.

FIG. 18A shows a stick with a tilt sensor 212. A tilt sensor smart-type target stick 212 is a device that is often used in training dogs for certain events and activities. For example, one activity for which dogs are trained is a "doggie go" activity. In a doggie go activity, the dog is trained to go out a certain distance away from the user to a pre-determined spot. When the dog reaches that spot, the dog is given a treat as a reward for going to that spot.

This is now accomplished usually with a second assistant who is positioned at the position that one wishes the dog to go. When the dog gets to the spot where the second person is positioned, the dog hits the stick that is tilted, the assistant will then give the dog a treat.

With the present invention, the stick with the tilt sensor 212 can be in wireless communication with a treat dispensing device 12 that is positioned near the tilt sensor 212. As such, the dog will be trained to go out and hit the stick 212, to thereby tilt the stick. After the stick is fetched, the dog will then be rewarded for this behavior by the treat dispensing device 12.

Figure 18C:
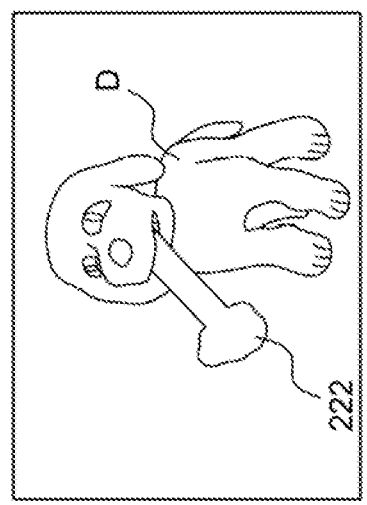
FIG. 18C is a schematic view of a Smart Toy type pet interactive device of the present invention.

Turning now to FIG. 18C, a smart tug toy 222 is used. In the smart tug toy 222, the smart tug toy 222 enables the dog to pull on a toy, thereby sending a signal to the treat dispensing device 12 to dispense a treat.

Several occasions occur where a tug toy 222 is used to condition the dog to perform a certain behavior. For example, with service dogs, a smart tug toy 222 can be employed that can sense the exertion of a constant pressure by the dog, as opposed to a jerking pressure. If this constant pressure is sensed by the smart tug toy 222, a signal is sent to the treat dispensing device 12 to dispense a treat. As discussed above, a constant pressure pull is desired behavior with certain service dogs, who are used to help pull their masters (who are often disabled) out of a wheel chair to assist the partially disabled person to get up out of their wheel chair.

Additionally, service dogs are often trained to help retrieve food and drinks and the like from refrigerators. In such a case, a tug toy is attached to the handle of the refrigerator. The animal can then exert a pressure on the tug toy 222 to pull the tug toy 222, and thereby open the refrigerator. By pulling the tug toy to open the refrigerator, the dog causes the tug toy 222 to send a signal to the treat dispensing unit to dispense a treat to reward the dog for pulling the tug toy.

Turning now to FIG. 18B, a touch screen 220 is shown. The touch screen 220 can be coupled to a treat dispensing device 12, to dispense a treat to the dog D, when the dog D has performed an appropriate action, such as by touching the touch screen 220, or a particular image of a touch screen 220.

Several instances exist wherein it would be beneficial to teach a dog D to touch a touch screen 220. One such example is in an emergency situation, wherein a don might be taught to hit an image on the touch screen 220 in response to its owner being in danger, such as the owner falling, or being incapacitated. The touch screen 220 through a computer and telephone link will then place a call to an emergency responder to alert the responder of the emergency.

In a protocol similar to that currently used with emergency alerts such as LIFELINE alerts, the actuation of the touch screen 220 by the dog D will cause a communication or audiovisual communication link to be created between a sensor, such as a microphone and/or camera and the touch pad 220 and the emergency responder. Through this link, the emergency responder may receive audio and/or visual inputs from the area to help make a determination of what is happening in the area.

Additionally, through a speaker, the responder can ask questions of the owner to determine if the owner is capable of responding and determining whether a true emergency exists and the level of distress being experienced by the user. Upon hearing satisfactory input from the owner, the responder may decide that no emergency exists. Alternately, if the emergency responder receives signals or input that cause the responder to believe that an emergency may exist, this input would likely cause the emergency responder to alert the appropriate ambulance, police department, or fire department, to visit the owner to ensure that the owner was safe, or attend to the owner if something is wrong.

Additionally, the touch screen 220 can be used as an environmental enrichment tool. For example, when an owner is spatially removed from a dog for a time period, a dog might become bored and/or either develop anxiety, lose their muscle tone though lack of exercise, or alternately, become bored and engage in destructive behaviors. By flashing different images, and training the dog to respond to those images, such as by touching the screen 220, the dog D can be stimulated while the owner is away, thus keep the dog from getting bored.

In one example, a plurality of touch screens 220 can be coupled to a single or multiple feeding stations. For example, touch screens may be placed in a bedroom, in a basement and in the living room. A noise emitted by the touch screen will alert the dog to the existence of action at the touch screen. Upon reaching the touch screen 220, the dog might be trained to touch a particular image. Upon touching the correct image, the dog is then be rewarded by a treat that might be kept in the room with the touch screen, or in a separate room of the house. By alternating various sounds between the various touch screens, a dog can be induced to run around the house to both gain some exercise, and prevent itself from being bored.

It is understood that scientific research exists that suggests that a dog can recognize images to a touch screen and can respond to those images by touching the touch screen.

Another input device that exists is a push button system 218 as shown in FIG. 18D. The push button 218 serves as an input that the dog can push upon becoming aware of one of a of a variety of events. For example, the push button 218 may communicate with the treat dispensing device 12, so that upon pushing the button 218, the treat dispenser will dispense a treat thereby enabling the dog to feed itself by pushing the button, and making the feeding process into something of a game. Additionally, the button 218 may be an emergency button that the dog could press if, for example, it sensed an emergency with its owner or at the house.

Figure 19:
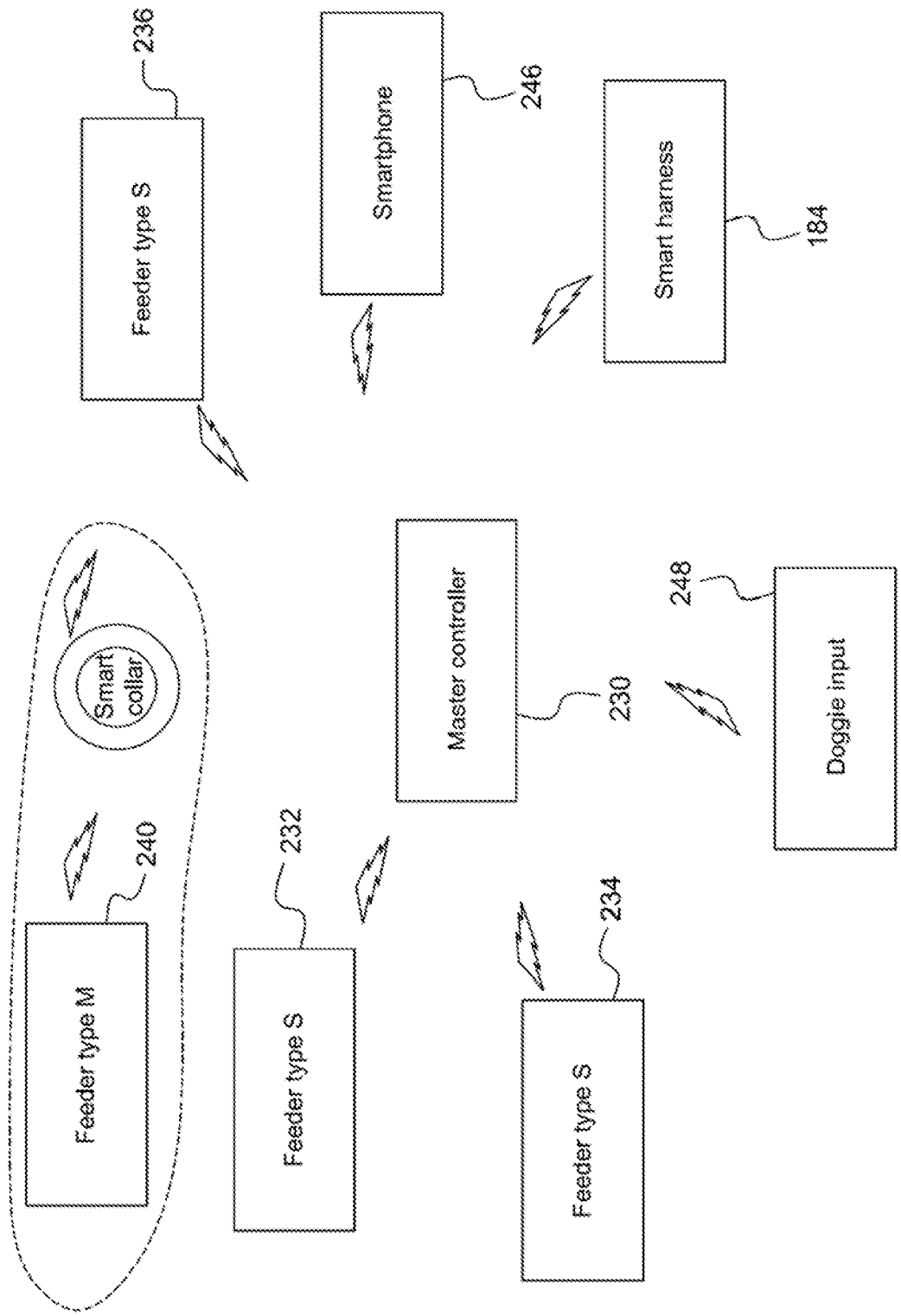
FIG. 19 is a schematic representation of a pet training system that comprises an aspect of the invention, and is useable with the reward dispensing device of the present invention.

FIG. 19 represents a schematic representation of an exemplary network example using a plurality of devices. In FIG. 19, the master controller 230 is capable of communicating with several different feeders, including stationary feeders 232, 234, 236 (feeder type S) and mobile feeders 240 (feeder type M). The master controller 230 also communicates with a Smart phone, a doggie input device, and the Smart harness 184 discussed above. Feeder type M 240 might be a mobile type feeder that is carried by the user on his/her belt (for example), or on the dog D, so that the dog D receives treats while on a walk or while moving around with the user.

Figure 20:
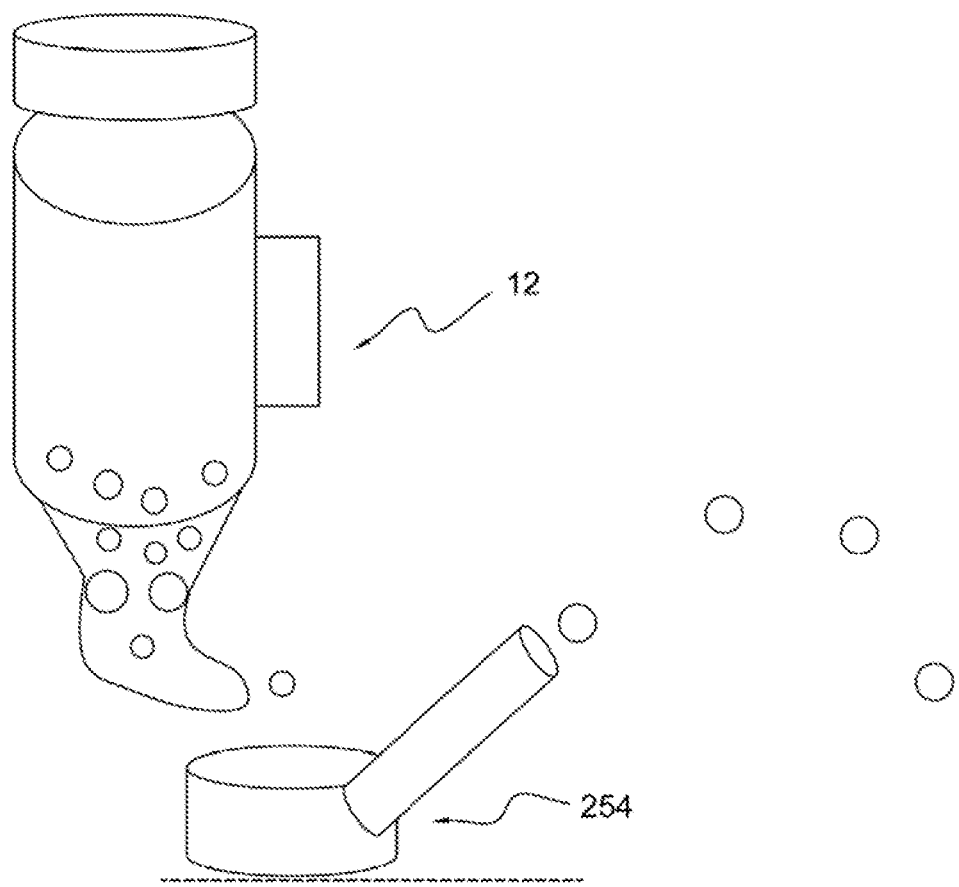
FIG. 20 illustrates another embodiment of the present invention wherein the pet reward dispensing device is used in connection with a reward launcher.

Turning now to FIG. 20, an alternate embodiment feeder accessory is shown. The feeder accessory includes a device referred herein as a treat cannon 254. In particular, the treat cannon 254 includes some device for propulsively "shooting" a treat a predetermined distance. The treat cannon 254 is positioned to receive treats dispensed by the treat feeder 254 and to shoot these dispensed treats a certain distance and direction. The treat cannon 254 may be used for several purposes.

One would be to use as a play device for the dog, because dogs enjoy chasing balls, treats, and the like. As such, the treat cannon 254 may be used to provide exercise for the dog, when the owners were away.

Treat cannons 254 may also be used in a training exercise commonly performed on dogs now that is used to treat dogs to come back to their owner. Currently, a treat is often thrown by the user a distance. By throwing the treat, the dog will chase the treat. Once the dog has picked up the treat, it will then be trained to return to the owner. In many respects, this treat cannon 254 will work similarly to a retrieval exercise where the dog is taught to retrieve and bring something back, except in this case, it gets to eat the treat.

Figure 21:
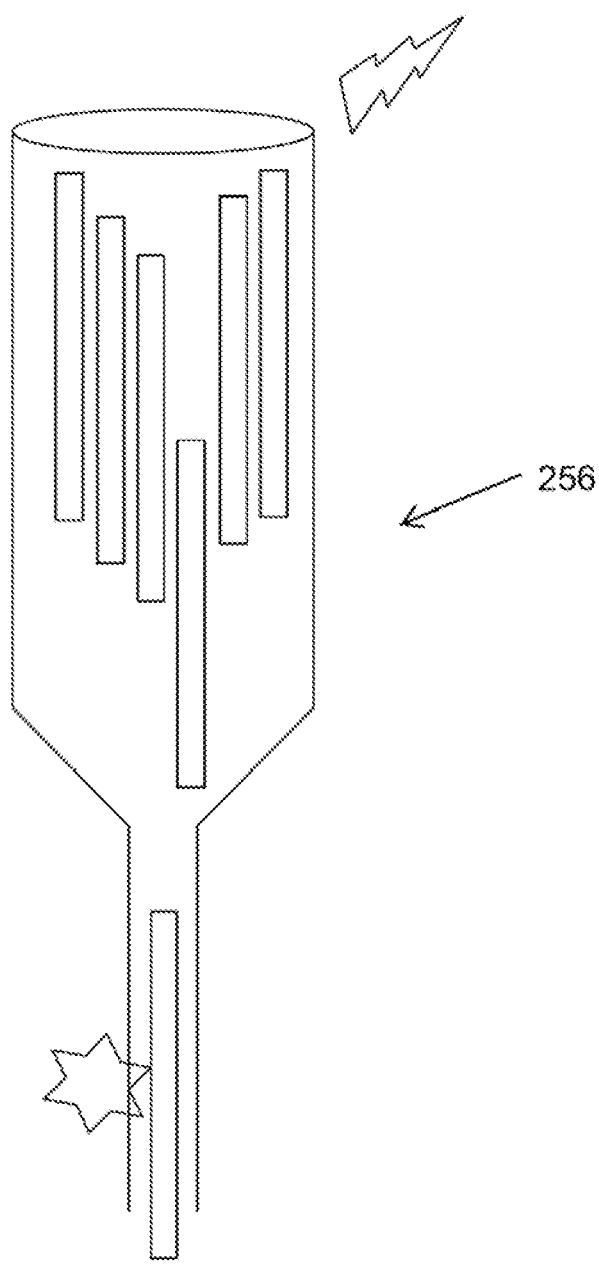
FIG. 21 is a schematic view of an alternate embodiment that is especially designed to dispense relatively long tubular treats, such as Pepperoni® Chew Animals.

Another alternate embodiment of the feeder is shown in FIG. 21. FIG. 21 shows a feeder configured to dispense rope shaped treats such as the Pupperoni® brand animal treats. The rope treat feeder 256 is a feeder that is designed to distribute pencil-sized and shaped treats, rather than the chunk-like kibble-like that is used by the other feeder.

Having described the invention in detail with referenced certain preferred embodiments, it will be appreciated that the scope and spirit of the invention incorporates modifications, variations and equivalents of the device described herein

What is claimed is:

1. An animal training device for training and enrichment of animals to perform or refrain from performing a target activity comprising
    a reward dispenser capable of dispensing a reward to an animal being trained upon receiving a reward dispensing command, the reward dispenser including
    a hopper for holding a quantity of rewards, the hopper including an entrance port for receiving rewards and an exit port through which rewards can be dispensed, and
    a delivery assembly for controllably delivering rewards from the hopper to the exit port, the delivery assembly including movable delivery members, placeable in contact with rewards to be delivered, a motor member capable of maintaining the delivery members in a static position to prevent the delivery of a reward, and moving the delivery member to deliver at least one reward to the exit port, the delivery member including at least one bristle containing member, and
    a controller capable of receiving a command and actuating the motor upon receipt of the command to move the delivery member to thereby dispense a reward to the exit port.

2. The animal training device of claim 1 wherein the reward comprises an edible reward and the animal comprises a pet.

3. The animal training device of claim 1 wherein the hopper includes an inwardly facing surface that defines an interior reward storage chamber of the animal training device.

4. The animal training device of claim 1 wherein the delivery assembly includes a housing disposed generally below the hopper, the delivery assembly includes a delivery member chamber in which the delivery members reside, and a channeling member for directing rewards in the storage chamber of the hopper to the delivery member chamber.

5. The animal training device of claim 4 wherein the channeling member includes a first angled surface having a raised outer portion and a lower inner portion, where a roller is disposed adjacent the lower inner portion.

6. The animal training device of claim 5 wherein the channeling member includes a second angled surface having a raised radially outer portion disposed adjacent to the inwardly facing surface of the hopper and a lowered portion disposed adjacent to the roller.

7. The animal training device of claim 6 wherein the roller includes a first roller rotatable about a first axis and a second roller rotatable about a second axis, and the motor includes a drive mechanism for causing rotary movement of the motor to rotate result in the first and second rollers rotating in a counter rotational manner to each other.

8. The animal training device of claim 7 where the motor is capable of moving the rollers a generally infinitely variable number of degrees of rotations to permit the user to deliver a desired member of rewards.

9. The animal training device of claim 7 wherein the first axis of rotation of the first roller is generally parallel to the second axis of rotation of the second roller, the first roller is driven by the motor and includes a driving gear and the second roller includes a driven gear engageable with the driving gear of the first roller for causing the second roller to be driven by the first roller and wherein the motor is capable of moving the roller in an infinitely variable number of degrees of rotations between a fractional number of rotations and a multiple number of rotations.

10. The animal training device of claim 4 wherein the delivery assembly housing includes a motor receiving chamber for housing the motor and the controller.

11. The animal training device of claim 1 wherein the controller includes a wireless receiver for receiving remote commands transmitted by a wireless transmitter, and upon receiving a remote command is capable of actuating the motor to move the delivery member to thereby dispense a reward to the exit port.

12. The animal training device of claim 11 wherein the controller includes a memory for storing a program and a plurality of discrete commands, and a processor capable of executing a plurality of reward deliveries based upon the plurality of discrete commands.

13. The animal training device of claim 11 wherein the controller further includes a wireless transmitter for transmitting at least one of data and commands to at least one of a wireless actuator and an animal interactive device.

14. The animal training device of claim 11 wherein the delivery member includes a first rotatable roller member including a plurality of radially outwardly extending bristle members, and a second rotatable roller member including a plurality radially extending bristles, the first and second rollers being positioned so that the bristles of the first roller are overlappingly positioned with the bristles of the second roller, to thereby prevent rewards from passing between the first and second roller when the first and second roller are in a static position.

15. The animal training device of claim 1 further comprising an animal interactive device which can engage in an interaction with an animal to be trained, the animal interactive device including a wireless communication device for wirelessly communicating commands to the controller of the animal training device.

16. The animal training device of claim 15 wherein the animal interactive device comprises a play device with which the animal can interact to learn a desired skill.

17. The animal training device of claim 15 wherein the animal interactive device comprises at least one sensor device for placement on the animal for sensing at least one attribute of the animal.

18. The animal training device of claim 17 wherein at least one of the attributes is selected from the group consisting of positional attributes, sound related attributes and physiological attributes.

19. The animal training device of claim 1 further comprising a base member for receiving the hopper for permitting the device to be positioned in an upstanding position on a horizontal surface, the base including a bowl portion for collecting rewards delivered from the exit port.

20. The animal training device of claim 1, further comprising a mounting bracket for mounting the animal training device on to a mounting object wherein the animal training device does not engage the ground.

21. The animal training device of claim 20 wherein the mounting object comprises at least one of a veterinary device, a cage, a human mobility device, car, tree, pole, bed, chair, furniture item, vehicle and stand.

* * * * *